United States Patent
Wu et al.

(10) Patent No.: US 11,652,515 B2
(45) Date of Patent: May 16, 2023

(54) METHOD AND DEVICE FOR FEEDING BACK CHANNEL STATE INFORMATION, AND METHOD AND DEVICE FOR DETERMINING CHANNEL STATE INFORMATION

(71) Applicant: ZTE CORPORATION, Guangdong (CN)

(72) Inventors: Hao Wu, Shenzhen (CN); Yu Ngok Li, Shenzhen (CN); Yijian Chen, Shenzhen (CN); Zhaohua Lu, Shenzhen (CN); Nan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/476,828

(22) PCT Filed: Dec. 28, 2017

(86) PCT No.: PCT/CN2017/119582
§ 371 (c)(1),
(2) Date: Jul. 9, 2019

(87) PCT Pub. No.: WO2018/126988
PCT Pub. Date: Jul. 12, 2018

(65) Prior Publication Data
US 2019/0363760 A1 Nov. 28, 2019

(30) Foreign Application Priority Data
Jan. 9, 2017 (CN) .......................... 201710014456.7

(51) Int. Cl.
*H04B 7/0417* (2017.01)
*H04B 7/0456* (2017.01)
(Continued)

(52) U.S. Cl.
CPC ......... *H04B 7/0417* (2013.01); *H04B 7/0456* (2013.01); *H04B 7/0626* (2013.01);
(Continued)

(58) Field of Classification Search
CPC ... H04B 7/0626; H04B 7/0634; H04B 7/0456
See application file for complete search history.

(56) References Cited

U.S. PATENT DOCUMENTS 8,761,129 B2   6/2014   Prasad et al.
8,798,011 B2   8/2014   Prasad et al.
(Continued)

FOREIGN PATENT DOCUMENTS

CN   102594527 A   7/2012
CN   103178888 A   6/2013
(Continued)

OTHER PUBLICATIONS

Extended European Search Report of corresponding Patent Application No. 17890769.7—12 pages (dated Aug. 3, 2020).
(Continued)

*Primary Examiner* — Ayaz R Sheikh
*Assistant Examiner* — Debebe A Asefa
(74) *Attorney, Agent, or Firm* — Knobbe, Martens, Olson & Bear, LLP

(57) ABSTRACT

Method and device for feeding back channel state information (CSI) and method and device for determining CSI are provided. The method for feeding back CSI includes feeding back CSI according to a determined structure of the CSI, where the structure of the CSI includes M CSI subsets; an m-th CSI subset among the M CSI subsets includes km channel information components. The M CSI subsets include N CSI subsets, and an n-th CSI subset among the N
(Continued)

CSI subsets includes Ln channel information components which are determined by transforming a group of base vectors.

8 Claims, 2 Drawing Sheets

(51) Int. Cl.
| | |
|---|---|
| *H04B 7/06* | (2006.01) |
| *H04W 24/10* | (2009.01) |
| *H04W 72/04* | (2009.01) |
| *H04W 80/08* | (2009.01) |
| *H04W 72/044* | (2023.01) |

(52) U.S. Cl.
CPC ......... *H04W 24/10* (2013.01); *H04W 72/046* (2013.01); *H04W 80/08* (2013.01)

(56) References Cited

U.S. PATENT DOCUMENTS

| | | | |
|---|---|---|---|
| 9,237,562 | B2 | 1/2016 | Yang et al. |
| 9,455,856 | B2 | 9/2016 | Tian et al. |
| 9,532,257 | B2 | 12/2016 | Prasad et al. |
| 2012/0275314 | A1 | 11/2012 | Prasad et al. |
| 2013/0010880 | A1* | 1/2013 | Koivisto ............... H04B 7/065 |
| | | | 375/259 |
| 2013/0286991 | A1 | 10/2013 | Yang et al. |
| 2014/0160967 | A1* | 6/2014 | Gao ..................... H04L 5/0073 |
| | | | 370/252 |
| 2014/0313976 | A1 | 10/2014 | Tian et al. |
| 2014/0341064 | A1 | 11/2014 | Prasad et al. |
| 2015/0195071 | A1* | 7/2015 | Lunttila ........... H04L 25/03904 |
| | | | 370/329 |
| 2016/0142117 | A1 | 5/2016 | Rahman et al. |
| 2016/0373175 | A1 | 12/2016 | Harrison et al. |
| 2017/0141827 | A1 | 5/2017 | Liu et al. |
| 2018/0262250 | A1* | 9/2018 | Kim ..................... H04B 17/309 |
| 2020/0204224 | A1* | 6/2020 | Kang ................... H04L 5/0094 |

FOREIGN PATENT DOCUMENTS

| | | |
|---|---|---|
| CN | 104081813 A | 10/2014 |
| CN | 104184560 A | 12/2014 |
| CN | 105991171 A | 10/2016 |
| CN | 106170927 A | 11/2016 |
| CN | 106302269 A | 1/2017 |
| CN | 103516464 B | 4/2018 |
| WO | 2014165711 A1 | 10/2014 |
| WO | WO 2015/131378 A1 | 9/2015 |
| WO | WO 2016/087055 A1 | 6/2016 |

OTHER PUBLICATIONS

ZTE Microelectronics, "Downloadable/Configurable codebook for NR MIMO", 3GPP TSG RAN WG1 Meeting #87, R1-1611418—6 pages (Nov. 13, 2016).

ZTE Microelectronics, "Linear combination based CSI report for NR MIMO", 3GPP TSG RAN WG1 Meeting #87, R1-1611419—5 pages (Nov. 13, 2016).

International Search Report of PCT Application No. PCT/CN2017/119582—4 pages (dated Feb. 27, 2018).

Chinese First Search Report from related CN App No. 201710014456.7.

Chinese First Office Action from related CN App No. 201710014456.7.

\* cited by examiner

METHOD AND DEVICE FOR FEEDING BACK CHANNEL STATE INFORMATION, AND METHOD AND DEVICE FOR DETERMINING CHANNEL STATE INFORMATION

CROSS REFERENCE TO RELATED APPLICATIONS

This is a U.S. National Stage Application, filed under 35 U.S.C. 371, of International Patent Application No. PCT/CN2017/119582, filed on Dec. 28, 2017, which claims priority to Chinese patent application No. 201710014456.7 filed on Jan. 9, 2017, contents of both of which are incorporated herein by reference in their entireties.

TECHNICAL FIELD

The present disclosure relates to the field of communications and, for example, to a method and a device for feeding back channel state information (CSI) and a method and a device for determining CSI.

BACKGROUND

In a wireless communication system, a transmitting end and a receiving end can use multiple antennas for transmission and reception to obtain a higher transmission rate. One principle of the multiple-input-multiple-output (MIMO) technology is to implement multi-layer transmission which matches channel characteristics by using some channel characteristics, thereby improving system performance without increasing bandwidth and power. The MIMO technology is very promising and has wide applications in the wireless communication system.

For example, the Long Term Evolution (LTE) system and the Long Term Evolution-Advanced (LTE-A) system have multiple transmission modes for a multi-antenna technology, such as a transmission mode 2 to a transmission mode 10. The multi-antenna technology involves many concepts and technologies. Some concepts are introduced below.

Channel state information (CSI) is fed back in two manners, that is, periodic feedback and aperiodic feedback. For example, in the LTE/LTE-A system, a physical uplink control channel (PUCCH) is utilized to perform the periodic feedback and a physical uplink shared channel (PUSCH) is utilized to perform the aperiodic feedback.

SUMMARY

The present disclosure provides a method and a device for feeding back CSI and a method and a device for determining CSI, which may solve the problem in the related technology that a correlation between multiple panels of antennas cannot be well fed back and inter-layer orthogonality cannot be guaranteed through a multi-layer linear combination codebook.

A method for feeding back CSI includes feeding back CSI according to a determined structure of the CSI.

The structure of the CSI includes M CSI subsets; an m-th CSI subset among the M CSI subsets includes $k_m$ channel information components; and the M CSI subsets include N CSI subsets, and an n-th CSI subset among the N CSI subsets includes $L_n$ channel information components which are determined by transforming a group of vectors; where M is a positive integer, N is a positive integer less than or equal to M, m and n are both positive integers, $k_m$ is an integer greater than or equal to 0, and $L_n$ is an integer greater than or equal to 0 and less than or equal to $k_m$.

In an embodiment, the $k_m$ channel information components include at least one of: $B_m$ pieces of precoding indication information, where $B_m$ is an integer greater than or equal to 0; $A_m$ pieces of weighting coefficient amplitude indication information, where $A_m$ is an integer greater than or equal to 0; $P_m$ pieces of weighting coefficient phase indication information, where $P_m$ is an integer greater than or equal to 0; or $R_m$ pieces of beam indication information, where $R_m$ is an integer greater than or equal to 0.

In an embodiment, in the CSI subset, information indicated by the $A_m$ pieces of weighting coefficient amplitude indication information and information indicated by the $P_m$ pieces of weighting coefficient phase indication information constitute a weighting coefficient vector, and weighting coefficient vectors of at least one group of CSI subsets are orthogonal to each other, where $A_m$ and $P_m$ are both integers greater than or equal to 0.

In an embodiment, the CSI subsets are determined according to at least one of: groups of measurement pilot resources; groups of measurement pilot ports; groups of demodulation pilot resources; groups of demodulation pilot ports; or layers.

In an embodiment, a manner for determining the CSI subsets is determined through at least one of: a high-layer signaling; or a physical layer signaling.

In an embodiment, information indicated by $b_m$ pieces of precoding indication information included in the $B_m$ pieces of precoding indication information is determined by at least one of: performing an angular rotation on information indicated by $b_n$ pieces of precoding indication information in the n-th CSI subset; performing an amplitude expansion on the information indicated by the $b_n$ pieces of precoding indication information in the n-th CSI subset; or performing a phase transformation on the information indicated by the $b_n$ pieces of precoding indication information in the n-th CSI subset; where $b_m$ and $b_n$ are both positive integers, and $b_m$ is less than or equal to $B_m$.

In an embodiment, the angular rotation is performed by acting an angular rotation matrix on the information indicated by the precoding indication information. The angular rotation matrix includes at least one of: an identity matrix; a first diagonal matrix whose diagonal elements constitute a discrete Fourier transform (DFT) vector; or a second diagonal matrix whose diagonal elements constitute a Kronecker product of S DFT vectors, where an s-th DFT vector among the S DFT vectors corresponds to an s-th piece of angular rotation information, where S is a positive integer greater than 1, and s is a positive integer greater than or equal to 1 and less than or equal to S.

In an embodiment, information indicated by precoding indication information in two CSI subsets included in the CSI subsets has same information on at least one of: the angular rotation, the amplitude expansion or the phase transformation.

In an embodiment, a value of $b_m$ is determined through at least one of: a high-layer signaling or a physical layer signaling; or a first agreement.

In an embodiment, the first agreement includes that $b_m$ is equal to $B_m$.

In an embodiment, at least one of a frequency domain feedback granularity of the angular rotation, a frequency domain feedback granularity of the amplitude expansion, a frequency domain feedback granularity of the phase transformation, a minimum variation unit of the angular rotation, a minimum variation unit of the amplitude expansion, or a minimum variation unit of the phase transformation is determined through at least one of: a high-layer signaling or a physical layer signaling; or a second agreement.

The frequency domain feedback granularity includes at least one of a subband feedback or a bandwidth feedback.

In an embodiment, the second agreement includes at least one of: a wideband feedback for the angular rotation; a wideband feedback for the amplitude expansion; or a subband feedback for the phase transformation.

In an embodiment, a feedback period of at least one of the angular rotation, the amplitude expansion or the phase transformation is determined through at least one of: a high-layer signaling or a physical layer signaling; or a third agreement.

In an embodiment, the third agreement includes that the feedback period of at least one of the angular rotation, the amplitude expansion or the phase transformation is consistent with a feedback period of the $b_n$ pieces of precoding indication information in the n-th CSI subset.

In an embodiment, the method further includes determining and reporting at least one of: a minimum variation unit of at least one of the angular rotation, the amplitude expansion or the phase transformation; a frequency domain feedback granularity of at least one of the angular rotation, the amplitude expansion or the phase transformation; or a feedback period of at least one of the angular rotation, the amplitude expansion or the phase transformation.

In an embodiment, the CSI includes at least one of precoding indication information or beam indication information, and at least one of information indicated by the precoding indication information or information indicated by the beam indication information of at least one of a k-th pilot resource group or a k-th pilot port group at an h-th layer is determined by performing at least one of an angular rotation, an amplitude expansion or a phase transformation on a group of base vectors.

In an embodiment, the group of base vectors includes one of: a vector in an identity matrix; or a plurality of column vectors in the identity matrix.

In an embodiment, the CSI includes the precoding indication information or the beam indication information, and the information indicated by the precoding indication information or the information indicated by the beam indication information of at least one of the k-th pilot resource group or the k-th pilot port group at the h-th layer has at least one of characteristics described below.

The information indicated by the precoding indication information or the information indicated by the beam indication information of each layer or each pilot resource group or each pilot port group is independently determined by the base vectors.

The information indicated by the precoding indication information or the information indicated by the beam indication information of different pilot resource groups or different pilot port groups at a same layer is determined by a same base vector.

The information indicated by the precoding indication information or the information indicated by the beam indication information of a same pilot resource group or a same pilot port group at different layers is independently determined by the base vectors.

The information indicated by the precoding indication information or the information indicated by the beam indication information of the same pilot resource group or the same pilot port group at the different layers is determined by the same base vector.

The information indicated by the precoding indication information or the information indicated by the beam indication information of the different pilot resource groups or the different pilot port groups at the same layer is independently determined by the base vectors.

The CSI at the same layer selects the precoding indication information or the beam indication information corresponding to a feedback of a partial resource or port.

The CSI at the different layers selects different resources or ports, and the precoding indication information or the beam indication information of the CSI at the different layers is independently determined by the group of base vectors.

In an embodiment, in the CSI at an h-th layer, at least one of information indicated by weighting coefficient amplitude indication information or information indicated by weighting coefficient phase indication information is determined by performing at least one of an angular rotation or a phase transformation on a group of base vectors, where h is an integer greater than or equal to 1.

In an embodiment, the group of base vectors is determined through at least one of: a high-layer signaling; a physical layer signaling; or a fourth agreement.

In an embodiment, the fourth agreement includes one of: selecting q columns of an identity matrix at a Q-th layer of the CSI to perform at least one of the angular rotation or the phase transformation, where the q columns include at least one of first $q_1$ columns or last $q_1$ columns; or performing at least one of the angular rotation or the phase transformation on different port groups at an X-th layer of the CSI according to x columns of the identity matrix, where the x columns include at least one of first $x_1$ columns or last $x_1$ columns.

In an embodiment, at least one of the angular rotation or the phase transformation includes: acting a transformation matrix on one or more vectors in the group of base vectors, where the transformation matrix includes at least one of t phase transformation matrices or a product of r angular rotation matrices, where t and r are both greater than or equal to 1.

In an embodiment, each of the phase transformation matrices is a diagonal matrix, where a diagonal element of the diagonal matrix includes at least one of: a positive real number; or a natural exponential function of a complex number.

In an embodiment, the CSI includes at least one of the following: The CSI at each layer corresponds to at least one of the phase transformation matrices, where the phase transformation matrix corresponding to the CSI at the h-th layer includes at least f(h) diagonal elements of 1, where f (h) is a positive integer function of 1, and f(h) is less than or equal to 1.

The CSI at the each layer corresponds to at least one of the angular rotation matrices, where the angular rotation matrix corresponding to the CSI at the h-th layer is determined by transforming at least one of elements in a g(h)-th row and an n-th column, elements in an n-th row and a g(h)-th column, elements in the g(h)-th row and the g(h)-th column, or elements in the n-th row and the n-th column in the identity matrix, where g(h) and n are both greater than or equal to 1, n is not equal to g(h), g(h) is a positive integer function of h, and a trigonometric function of a real number is obtained after the elements are transformed.

In an embodiment, a number of angular rotation matrices corresponding to the CSI at the each layer decreases with an increase of a number of layers of the angular rotation matrix.

In an embodiment, at least one of a frequency domain feedback granularity of information in the phase transformation matrix, a frequency domain feedback granularity of information in the angular rotation matrix, a feedback period of the information in the phase transformation matrix, a feedback period of the information in the angular rotation matrix, a minimum variation unit of the information in the phase transformation matrix or a minimum variation unit of the information in the angular rotation matrix is determined through at least one of: a high-layer signaling; a physical layer signaling; or a fifth agreement.

In an embodiment, the fifth agreement includes at least one of: a wideband feedback of the information in the angular rotation matrix; a subband feedback of the information in the phase transformation matrix; the feedback period of the information in the angular rotation matrix being C times the feedback period of the information in the phase transformation matrix, where C is a positive integer; or the information in the angular rotation matrix having at least one of a same feedback period or a same frequency domain feedback granularity as precoding indication information in a corresponding CSI subset.

In an embodiment, the method further includes determining and reporting at least one of: a frequency domain feedback granularity of information in the phase transformation matrix; a frequency domain feedback granularity of information in the angular rotation matrix; a feedback period of the information in the phase transformation matrix; a feedback period of the information in the angular rotation matrix; a minimum variation unit of the information in the phase transformation matrix; or a minimum variation unit of the information in the angular rotation matrix.

In an embodiment, the CSI at a same layer has at least two port groups with at least one of same phase transformation information or same angular rotation information.

In an embodiment, for the CSI of different port groups, at least one of phase transformation information or angular rotation information is fed back in at least one of manners described below.

At least one of the phase transformation information or the angular rotation information is separately fed back for the different port groups.

At least one of the phase transformation information or the angular rotation information is jointly fed back for the different port groups.

A method for determining CSI includes determining CSI fed back by a terminal according to a structure of the CSI.

A specific structure of the CSI includes M CSI subsets; an m-th CSI subset among the M CSI subsets includes $k_m$ channel information components; and the M CSI subsets include N CSI subsets, and an n-th CSI subset among the N CSI subsets includes $L_n$ channel information components which are determined by transforming a group of vectors; where M is a positive integer, N is a positive integer less than or equal to M, m and n are both positive integers, $k_m$ is an integer greater than or equal to 0, and $L_n$ is an integer greater than or equal to 0 and less than or equal to $k_m$.

In an embodiment, the $k_m$ channel information components include at least one of: $B_m$ pieces of precoding indication information, where $B_m$ is an integer greater than or equal to 0; $A_m$ pieces of weighting coefficient amplitude indication information, where $A_m$ is an integer greater than or equal to 0; $P_m$ pieces of weighting coefficient phase indication information, where $P_m$ is an integer greater than or equal to 0; or $R_m$ pieces of beam indication information, where $R_m$ is an integer greater than or equal to 0.

In an embodiment, in the CSI subset, information indicated by the $A_m$ pieces of weighting coefficient amplitude indication information and information indicated by the $P_m$ pieces of weighting coefficient phase indication information constitute a weighting coefficient vector, and weighting coefficient vectors of at least one group of CSI subsets are orthogonal to each other, where $A_m$ and $P_m$ are both integers greater than or equal to 0.

In an embodiment, the CSI subsets are determined according to at least one of: groups of measurement pilot resources; groups of measurement pilot ports; groups of demodulation pilot resources; groups of demodulation pilot ports; or layers.

In an embodiment, a manner for determining the CSI subsets is determined by at least one of: notifying the terminal to determine the manner via a high-layer signaling; or notifying the terminal to determine the manner via a physical layer signaling.

In an embodiment, information indicated by $b_m$ pieces of precoding indication information included in the $B_m$ pieces of precoding indication information is determined by at least one of: performing an angular rotation on information indicated by $b_n$ pieces of precoding indication information in the n-th CSI subset; performing an amplitude expansion on the information indicated by the $b_n$ pieces of precoding indication information in the n-th CSI subset; or performing a phase transformation on the information indicated by the $b_n$ pieces of precoding indication information in the n-th CSI subset; where $b_m$ and $b_n$ are both positive integers, and $b_m$ is less than or equal to $B_m$.

In an embodiment, the angular rotation is performed by acting an angular rotation matrix on the information indicated by the precoding indication information, where the angular rotation matrix includes at least one of: an identity matrix; a first diagonal matrix whose diagonal elements constitute a discrete Fourier transform (DFT) vector; or a second diagonal matrix whose diagonal elements constitute a Kronecker product of S DFT vectors, where an s-th DFT vector among the S DFT vectors corresponds to an s-th piece of angular rotation information, where S is a positive integer greater than 1, and s is a positive integer greater than or equal to 1 and less than or equal to S.

In an embodiment, information indicated by precoding indication information in at least two CSI subsets included in the CSI subsets has same information on at least one of: the angular rotation, the amplitude expansion or the phase transformation.

In an embodiment, a value of $b_m$ is determined by at least one of: notifying the terminal to determine the value of $b_m$ via a high-layer signaling; notifying the terminal to determine the value of $b_m$ via a physical layer signaling; or a first agreement.

In an embodiment, the first agreement includes that $b_m$ is equal to $B_m$.

In an embodiment, at least one of a frequency domain feedback granularity of the angular rotation, a frequency domain feedback granularity of the amplitude expansion, a frequency domain feedback granularity of the phase transformation, a minimum variation unit of the angular rotation, a minimum variation unit of the amplitude expansion, or a minimum variation unit of the phase transformation is determined by at least one of: notifying the terminal to perform determination via a high-layer signaling or a physical layer signaling; or a second agreement.

The frequency domain feedback granularity includes at least one of a subband feedback or a bandwidth feedback.

In an embodiment, the second agreement includes at least one of: a wideband feedback for the angular rotation; a wideband feedback for the amplitude expansion; or a subband feedback for the phase transformation.

In an embodiment, a feedback period of at least one of the angular rotation, the amplitude expansion or the phase transformation is determined by at least one of: notifying the terminal to determine the feedback period via a high-layer signaling or a physical layer signaling; or a third agreement.

In an embodiment, the third agreement includes that the feedback period of at least one of the angular rotation, the amplitude expansion or the phase transformation is consistent with a feedback period of the $b_n$ pieces of precoding indication information in the n-th CSI subset.

In an embodiment, the method further includes receiving at least one of: a minimum variation unit of at least one of the angular rotation, the amplitude expansion or the phase transformation; a frequency domain feedback granularity of at least one of the angular rotation, the amplitude expansion or the phase transformation; or a feedback period of at least one of the angular rotation, the amplitude expansion or the phase transformation.

In an embodiment, the CSI includes at least one of precoding indication information or beam indication information, and at least one of information indicated by the precoding indication information or information indicated by the beam indication information of at least one of a k-th pilot resource group or a k-th pilot port group at an h-th layer is determined by performing at least one of an angular rotation, an amplitude expansion or a phase transformation on a group of base vectors.

In an embodiment, the group of base vectors includes one of: a vector in an identity matrix; or a plurality of column vectors in the identity matrix.

In an embodiment, the CSI includes the precoding indication information or the beam indication information, and the information indicated by the precoding indication information or the information indicated by the beam indication information of at least one of the k-th pilot resource group or the k-th pilot port group at the h-th layer has at least one of characteristics described below.

The information indicated by the precoding indication information or the information indicated by the beam indication information of each layer or each pilot resource group or each pilot port group is independently determined by the base vectors.

The information indicated by the precoding indication information or the information indicated by the beam indication information of different pilot resource groups or different pilot port groups at a same layer is determined by a same base vector.

The information indicated by the precoding indication information or the information indicated by the beam indication information of a same pilot resource group or a same pilot port group at different layers is independently determined by the base vectors.

The information indicated by the precoding indication information or the information indicated by the beam indication information of the same pilot resource group or the same pilot port group at the different layers is determined by the same base vector.

The information indicated by the precoding indication information or the information indicated by the beam indication information of the different pilot resource groups or the different pilot port groups at the same layer is independently determined by the base vectors.

The CSI at the same layer selects the precoding indication information or the beam indication information corresponding to a feedback of a partial resource or port.

The CSI at the different layers selects different resources or ports, and the precoding indication information or the beam indication information of the CSI at the different layers is independently determined by the group of base vectors.

In an embodiment, in the CSI at an h-th layer, at least one of information indicated by weighting coefficient amplitude indication information or information indicated by weighting coefficient phase indication information is determined by performing at least one of an angular rotation or a phase transformation on a group of base vectors, where h is an integer greater than or equal to 1.

In an embodiment, the group of base vectors is determined by at least one of: notifying the terminal to determine the group of base vectors via a high-layer signaling; notifying the terminal to determine the group of base vectors via a physical layer signaling; or a fourth agreement.

In an embodiment, the fourth agreement includes one of: selecting q columns of an identity matrix at a Q-th layer of the CSI to perform at least one of the angular rotation or the phase transformation, where the q columns include at least one of first $q_1$ columns or last $q_1$ columns; or performing at least one of the angular rotation or the phase transformation on different port groups at an X-th layer of the CSI according to x columns of the identity matrix, where the x columns include at least one of first $x_1$ columns or last $x_1$ columns.

In an embodiment, at least one of the angular rotation or the phase transformation includes: acting a transformation matrix on one or more vectors in the group of base vectors, where the transformation matrix includes at least one of t phase transformation matrices or a product of r angular rotation matrices, where t and r are both greater than or equal to 1.

In an embodiment, each of the phase transformation matrices is a diagonal matrix, where a diagonal element of the diagonal matrix includes at least one of: a positive real number; or a natural exponential function of a complex number.

In an embodiment, the CSI satisfies at least one of the following: The CSI at each layer corresponds to at least one of the phase transformation matrices, where the phase transformation matrix corresponding to the CSI at the h-th layer includes at least f(h) diagonal elements of 1, where f (h) is a positive integer function of 1, and f(h) is less than or equal to 1.

The CSI at the each layer corresponds to at least one of the angular rotation matrices, where the angular rotation matrix corresponding to the CSI at the h-th layer is determined by transforming at least one of elements in a g(h)-th row and an n-th column, elements in an n-th row and a g(h)-th column, elements in the g(h)-th row and the g(h)-th column, or elements in the n-th row and the n-th column in the identity matrix, where g(h) and n are both greater than or equal to 1, n is not equal to g(h), g(h) is a positive integer function of 1, and a trigonometric function of a real number is obtained after the elements are transformed.

In an embodiment, a number of angular rotation matrices corresponding to the CSI at the each layer decreases with an increase of a number of layers of the angular rotation matrix.

In an embodiment, at least one of a frequency domain feedback granularity of information in the phase transformation matrix, a frequency domain feedback granularity of information in the angular rotation matrix, a feedback period of the information in the phase transformation matrix, a feedback period of the angular rotation matrix, a minimum variation unit of the phase transformation matrix or a minimum variation unit of the information in the angular rotation matrix is determined by at least one of: notifying the terminal to perform determination via a high-layer signaling;

notifying the terminal to perform determination via a physical layer signaling; or a fifth agreement.

In an embodiment, the fifth agreement includes at least one of: a wideband feedback of the information in the angular rotation matrix; a subband feedback of the information in the phase transformation matrix; a feedback period of the information in the angular rotation matrix being C times the feedback period of the information in the phase transformation matrix, where C is a positive integer; or the information in the angular rotation matrix having at least one of a same feedback period or a same frequency domain feedback granularity as precoding indication information in a corresponding CSI subset.

In an embodiment, the method further includes receiving at least one of: a frequency domain feedback granularity of information in the phase transformation matrix; a frequency domain feedback granularity of information in the angular rotation matrix; a feedback period of the information in the phase transformation matrix; a feedback period of the information in the angular rotation matrix; a minimum variation unit of the information in the phase transformation matrix; or a minimum variation unit of the information in the angular rotation matrix.

In an embodiment, the CSI at a same layer has at least two port groups with at least one of same phase transformation information or same angular rotation information.

In an embodiment, for the CSI of different port groups, at least one of phase transformation information or angular rotation information fed back by the terminal is received in at least one of manners described below.

At least one of the phase transformation information or the angular rotation information is separately fed back for the different port groups.

At least one of the phase transformation information or the angular rotation information is jointly fed back for the different port groups.

A device for feeding back CSI includes a feedback module.

The feedback module is configured to feed back CSI according to a determined structure of the CSI.

The structure of the CSI includes M CSI subsets; an m-th CSI subset among the M CSI subsets includes $k_m$ channel information components; and the M CSI subsets include N CSI subsets, and an n-th CSI subset among the N CSI subsets includes $L_n$ channel information components which are determined by transforming a group of vectors; where M is a positive integer, N is a positive integer less than or equal to M, m and n are both positive integers, $k_m$ is an integer greater than or equal to 0, and $L_n$ is an integer greater than or equal to 0 and less than or equal to $k_m$.

In an embodiment, the $k_m$ channel information components include at least one of: $B_m$ pieces of precoding indication information, where $B_m$ is an integer greater than or equal to 0; $A_m$ pieces of weighting coefficient amplitude indication information, where $A_m$ is an integer greater than or equal to 0; $P_m$ pieces of weighting coefficient phase indication information, where $P_m$ is an integer greater than or equal to 0; or $R_m$ pieces of beam indication information, where $R_m$ is an integer greater than or equal to 0.

In an embodiment, in the CSI subset, information indicated by the $A_m$ pieces of weighting coefficient amplitude indication information and information indicated by the $P_m$ pieces of weighting coefficient phase indication information constitute a weighting coefficient vector, and weighting coefficient vectors of at least one group of CSI subsets are orthogonal to each other, where $A_m$ and $P_m$ are both integers greater than or equal to 0.

In an embodiment, the CSI subsets are determined according to at least one of: groups of measurement pilot resources; groups of measurement pilot ports; groups of demodulation pilot resources; groups of demodulation pilot ports; or layers.

In an embodiment, a manner for determining the CSI subsets is determined through at least one of: a high-layer signaling; or a physical layer signaling.

In an embodiment, information indicated by $b_m$ pieces of precoding indication information included in the $B_m$ pieces of precoding indication information is determined by at least one of: performing an angular rotation on information indicated by $b_n$ pieces of precoding indication information in the n-th CSI subset; performing an amplitude expansion on the information indicated by the $b_n$ pieces of precoding indication information in the n-th CSI subset; or performing a phase transformation on the information indicated by the $b_n$ pieces of precoding indication information in the n-th CSI subset; where $b_m$ and $b_n$ are both positive integers, and $b_m$ is less than or equal to $B_m$.

A device for determining CSI includes a determining module.

The determining module is configured to determine CSI fed back by a terminal according to a structure of the CSI.

A specific structure of the CSI includes M CSI subsets; an m-th CSI subset among the M CSI subsets includes $k_m$ channel information components; and the M CSI subsets include N CSI subsets, and an n-th CSI subset among the N CSI subsets includes $L_n$ channel information components which are determined by transforming a group of vectors; where M is a positive integer, N is a positive integer less than or equal to M, m and n are both positive integers, $k_m$ is an integer greater than or equal to 0, and $L_n$ is an integer greater than or equal to 0 and less than or equal to $k_m$.

In an embodiment, the $k_m$ channel information components include at least one of: $B_m$ pieces of precoding indication information, where $B_m$ is an integer greater than or equal to 0; $A_m$ pieces of weighting coefficient amplitude indication information, where $A_m$ is an integer greater than or equal to 0; $P_m$ pieces of weighting coefficient phase indication information, where $P_m$ is an integer greater than or equal to 0; or $R_m$ pieces of beam indication information, where $R_m$ is an integer greater than or equal to 0.

In an embodiment, in the CSI subset, information indicated by the $A_m$ pieces of weighting coefficient amplitude indication information and information indicated by the $P_m$ pieces of weighting coefficient phase indication information constitute a weighting coefficient vector, and weighting coefficient vectors of at least one group of CSI subsets are orthogonal to each other, where $A_m$ and $P_m$ are both integers greater than or equal to 0.

In an embodiment, the CSI subsets are determined according to at least one of: groups of measurement pilot resources; groups of measurement pilot ports; groups of demodulation pilot resources; groups of demodulation pilot ports; or layers.

In an embodiment, a manner for determining the CSI subsets is determined by at least one of: notifying the terminal to determine the manner via a high-layer signaling; or notifying the terminal to determine the manner via a physical layer signaling.

In an embodiment, information indicated by $b_m$ pieces of precoding indication information included in the $B_m$ pieces of precoding indication information is determined by at least one of: performing an angular rotation on information indicated by $b_n$ pieces of precoding indication information in the n-th CSI subset; performing an amplitude expansion on the information indicated by the $b_n$ pieces of precoding indication information in the n-th CSI subset; or performing a phase transformation on the information indicated by the $b_n$ pieces of precoding indication information in the n-th CSI subset; where $b_m$ and $b_n$ are both positive integers, and $b_m$ is less than or equal to $B_m$.

A device for feeding back CSI includes a first processor and a first memory, configured to store instructions executable by the first processor.

The first processor is configured to feed back CSI according to a determined structure of the CSI.

The structure of the CSI includes M CSI subsets; an m-th CSI subset among the M CSI subsets includes $k_m$ channel information components; and the M CSI subsets include N CSI subsets, and an n-th CSI subset among the N CSI subsets includes $L_n$ channel information components which are determined by transforming a group of vectors; where M is a positive integer, N is a positive integer less than or equal to M, m and n are both positive integers, $k_m$ is an integer greater than or equal to 0, and $L_n$ is an integer greater than or equal to 0 and less than or equal to $k_m$.

In an embodiment, the $k_m$ channel information components include at least one of: $B_m$ pieces of precoding indication information, where $B_m$ is an integer greater than or equal to 0; $A_m$ pieces of weighting coefficient amplitude indication information, where $A_m$ is an integer greater than or equal to 0; $P_m$ pieces of weighting coefficient phase indication information, where $P_m$ is an integer greater than or equal to 0; or $R_m$ pieces of beam indication information, where $R_m$ is an integer greater than or equal to 0.

In an embodiment, in the CSI subset, information indicated by the $A_m$ pieces of weighting coefficient amplitude indication information and information indicated by the $P_m$ pieces of weighting coefficient phase indication information constitute a weighting coefficient vector, and weighting coefficient vectors of at least one group of CSI subsets are orthogonal to each other, where $A_m$ and $P_m$ are both integers greater than or equal to 0.

In an embodiment, the CSI subsets are determined according to at least one of: groups of measurement pilot resources; groups of measurement pilot ports; groups of demodulation pilot resources; groups of demodulation pilot ports; or layers.

In an embodiment, a manner for determining the CSI subsets is determined through at least one of: a high-layer signaling; or a physical layer signaling.

In an embodiment, information indicated by $b_m$ pieces of precoding indication information included in the $B_m$ pieces of precoding indication information is determined by at least one of: performing an angular rotation on information indicated by $b_n$ pieces of precoding indication information in the n-th CSI subset; performing an amplitude expansion on the information indicated by the $b_n$ pieces of precoding indication information in the n-th CSI subset; or performing a phase transformation on the information indicated by the $b_n$ pieces of precoding indication information in the n-th CSI subset; where $b_m$ and $b_n$ are both positive integers, and $b_m$ is less than or equal to $B_m$.

A device for determining CSI includes a second processor and a second memory, configured to store instructions executable by the second processor.

The second processor is configured to determine CSI fed back by a terminal according to a structure of the CSI.

A specific structure of the CSI includes M CSI subsets; an m-th CSI subset among the M CSI subsets includes $k_m$ channel information components; and the M CSI subsets include N CSI subsets, and an n-th CSI subset among the N CSI subsets includes $L_n$ channel information components which are determined by transforming a group of vectors; where M is a positive integer, N is a positive integer less than or equal to M, m and n are both positive integers, $k_m$ is an integer greater than or equal to 0, and $L_n$ is an integer greater than or equal to 0 and less than or equal to $k_m$.

In an embodiment, the $k_m$ channel information components include at least one of: $B_m$ pieces of precoding indication information, where $B_m$ is an integer greater than or equal to 0; $A_m$ pieces of weighting coefficient amplitude indication information, where $A_m$ is an integer greater than or equal to 0; $P_m$ pieces of weighting coefficient phase indication information, where $P_m$ is an integer greater than or equal to 0; or $R_m$ pieces of beam indication information, where $R_m$ is an integer greater than or equal to 0.

In an embodiment, in the CSI subset, information indicated by the $A_m$ pieces of weighting coefficient amplitude indication information and information indicated by the $P_m$ pieces of weighting coefficient phase indication information constitute a weighting coefficient vector, and weighting coefficient vectors of at least one group of CSI subsets are orthogonal to each other, where $A_m$ and $P_m$ are both integers greater than or equal to 0.

In an embodiment, the CSI subsets are determined according to at least one of: groups of measurement pilot resources; groups of measurement pilot ports; groups of demodulation pilot resources; groups of demodulation pilot ports; or layers.

In an embodiment, a manner for determining the CSI subsets is determined by at least one of: notifying the terminal to determine the manner via a high-layer signaling; or notifying the terminal to determine the manner via a physical layer signaling.

In an embodiment, information indicated by $b_m$ pieces of precoding indication information included in the $B_m$ pieces of precoding indication information is determined by at least one of: performing an angular rotation on information indicated by $b_n$ pieces of precoding indication information in the n-th CSI subset; performing an amplitude expansion on the information indicated by the $b_n$ pieces of precoding indication information in the n-th CSI subset; or performing a phase transformation on the information indicated by the $b_n$ pieces of precoding indication information in the n-th CSI subset; where $b_m$ and $b_n$ are both positive integers, and $b_m$ is less than or equal to $B_m$.

A computer-readable storage medium is configured to store computer-executable instructions for executing any method described above.

DETAILED DESCRIPTION

Figure 1:
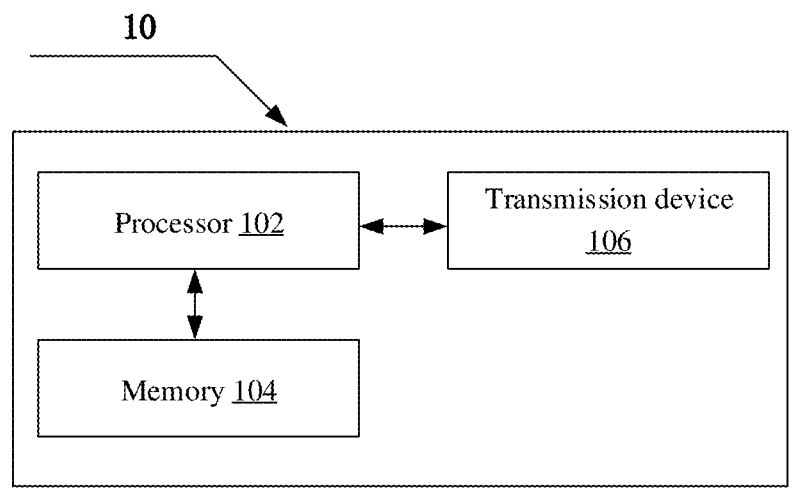
FIG. 1 is a block diagram of hardware of a mobile terminal according to an embodiment.

The terms "first", "second" and the like in the description, claims and above drawings of the present application are used to distinguish between similar objects and are not necessarily used to describe a particular order or sequence.

A terminal feeds back CSI in two manners: a base station may configure the terminal to measure and quantify channel information and periodically feed back the quantified CSI through a PUCCH. The CSI includes a rank indicator (RI), a precoding matrix indicator (PMI) or a channel quality indication (CQI). The base station may also aperiodically triggers the terminal to report the CSI (including the RI, the PMI or the CQI) through a PUSCH when the CSI is required, to overcome the problems that the periodic feedback is performed with insufficient real-time performance and a CSI quantification accuracy is limited by control channel overheads.

A principle for quantifying and feeding back the channel information based on a codebook is described below.

Assuming that a limited feedback channel capacity is B bps/Hz, a number of available codewords is $N=2^B$. A feature vector space of a channel matrix is quantified to form a codebook space $\Re=\{F_1, F_2 \ldots F_N\}$. A transmitting end and a receiving end jointly store the codebook or generate the codebook in real time (the transmitting end and the receiving end have a same codebook). The receiving end selects a codeword $\hat{F}$ which best matches a channel from $\Re$ according to a channel matrix H obtained by the receiving end and a certain rule and feeds back a serial number i of the codeword (that is, the PMI) to the transmitting end. The transmitting end finds a corresponding precoding codeword $\hat{F}$ according to the serial number i and obtains the channel information, where $\hat{F}$ represents feature vector information of the channel.

A principle for constructing the codeword in an LTE system is described as follows. The codebook of the LTE is also evolving with an evolution of a standard release. In a release 8 and a release 9, a 4-antenna codebook and a 2-antenna codebook both use a single codeword and a value of only one PMI is represented as $i=1, \ldots, N_{11}$, where $N_{11}$ is a number of codewords. For an 8-antenna codebook in a release 10 and a 4-antenna codebook in a release 12, a dual codebook feedback form is used. That is, the codeword may be written as $W=W_1*W_2$, where $W_1$ is a long-term feedback codebook called as a first codebook and $W_2$ represents a short-term feedback codebook called as a second codebook. $W_2$ is adopted to select one from $M_1$ alternative beams in codewords of $W_1$ and select a polarization phase, co-phasing, for beams selected for respective polarization directions at a same data layer. Each codeword in $W_2$ is quantified and fed back by $PMI_2$ whose value is $i_2=1, \ldots, M_1$, where $M_1$ is a number of $W_2$. For details, refer to an LTE release 10.

The codeword in releases before the release 12 is targeted for a one-dimensional (1D) antenna array and belongs to a 1D codeword. In a design of the codebook in a release 13, a dimension of the codebook becomes larger due to the use of more antennas. A topology of antennas is generally planar, that is, a 2D codeword is designed for an antenna with two dimensions. Therefore, each beam in the first codebook $W_1$ has a two-dimensional form $v_m \otimes u_n$, where $v_m$ and $u_n$ are respectively discrete Fourier transform (DFT) vectors in a first dimension and a second dimension, $v_m \otimes u_n$ represents a Kronecker product of $v_m$ and $u_n$, and $m=1, 2, \ldots B_1$, $n=1, 2, \ldots, B_2$. A number of ports in the first dimension (including an antenna/port/transport unit/element/array element and other devices capable of sending a signal) is $N_1$ and a number of ports in the second dimension is $N_2$. $O_1$-fold oversampling is performed on the DFT corresponding to the ports in the first dimension and $O_2$-fold oversampling is performed on the DFT corresponding to the ports in the second dimension. A number of DFT vectors of antennas in the first dimension or the second dimension is a product of an oversampling factor and the number of corresponding ports and thus $B_1=N_1*O_1$ and $B_2=N_2*O_2$, where $O_1$ is an oversampling factor in the first dimension and $O_2$ is an oversampling factor in the second dimension. A codebook in the first dimension of the first codebook is represented by $PMI_1$ whose value is $i_{11}=1, \ldots, N_{11}$, and a codebook in the second dimension of the first codebook is represented by $PMI_{12}$ whose value is $i_{12}=1, \ldots, N_{12}$. For each index of $PMI_{11}$ and $PMI_{12}$, there are $W_2$ codewords at a number of $M_1$; each $W_2$ codeword is used for selecting a two-dimensional beam $v_m \otimes u_n$ from $W_1$ and the co-phasing in different polarization directions, and a corresponding codeword index is $PMI_2$ represented by $i_2=1, \ldots, M_1$.

The codeword in a case that the number of ports in the first dimension is $N_{11}=1$ or the number of ports in the second dimension is $N_{12}=1$ is the 1D codeword, and the codeword in a case that the number of ports in the first dimension is $N_{11}>1$ or the number of ports in the second dimension is $N_{12}>1$ is the 2D codeword. The 1D codeword in a single codeword structure is represented by the PMI or i, the 1D codeword in a dual codeword structure is jointly represented by $PMI_1$ and $PMI_2$ and an index is jointly represented by $i_1$ and $i_2$, and the 2D codeword is jointly represented by three codebook indexes: $PMI_{11}$, $PMI_{12}$ and $PMI_2$, or jointly represented by indexes $i_{11}$, $i_{12}$ and $i_2$.

In the preceding PMI feedback method, a precoding matrix is fed back or a beam is configured based on information of a strongest path in the channel while information of other paths in the channel is ignored so that information which is fed back or configured cannot match the channel well, affecting system performance adversely. Therefore, in a discussion in the LTE Rel-14, a linear combination codebook is introduced to improve the CSI feedback accuracy. In the linear combination codebook, the precoding codeword is obtained by combing a group of one-dimensional or two-dimensional DFT vectors through linear weighting. A group of beams are determined by the preceding PMI feedback, and information related to a weighting coefficient amplitude and a weighting coefficient phase of each beam is fed back to obtain a final precoding. In a feedback of the linear combination codebook in the related technology, beam selections are orthogonal, but weighted amplitudes and weighted phases cannot guarantee that final multi-layer precodings are orthogonal to each other, which may cause losses to performance of single-user MIMO with a large number of layers. In addition, in the 5G an antenna array will expand from one panel to multiple panels. Beam selections of different panels may be different or may have a certain correlation. Therefore, how to optimize the beam selections of different panels is a problem to be solved.

The problem exists in the related technology that a correlation between multiple panels of antennas cannot be well fed back and inter-layer orthogonality cannot be guaranteed through a multi-layer linear combination codebook. Methods provided by the embodiments described below may be executed in a mobile terminal, a computer terminal or other similar computing devices. In an embodiment, taking the methods to be executed in the mobile terminal as an example, FIG. 1 is a block diagram of hardware of a mobile terminal according to the embodiment. As shown in FIG. 1, a mobile terminal 10 may include one or more (only one is shown in FIG. 1) processors 102 (the processor 102 may include a processing device such as a micro computer unit (MCU) or a field-programmable gate array (FPGA)), a memory 104 configured to store data, and a transmission device 106 with a communication function. The structure shown in FIG. 1 is merely illustrative. For example, the mobile terminal 10 may further include more or fewer components than the components shown in FIG. 1 or may have a configuration different from the configuration shown in FIG. 1.

The memory 104 may be configured to store software programs and modules of application software, such as program instructions or modules corresponding to the method for feeding back CSI in the embodiments described below. The processor 102 executes the software programs and modules stored in the memory 104 to perform various function applications and data processing, that is, to implement the methods described below. The memory 104 may include a high-speed random access memory, and may further include a nonvolatile memory such as one or more magnetic storage devices, flash memories or other nonvolatile solid-state memories. In some examples, the memory 104 may include memories which are remotely disposed with respect to the processor 102 and these remote memories may be connected to the mobile terminal 10 via a network. Examples of the preceding network include the Internet, an intranet, a local area network, a mobile communication network and a combination thereof.

The transmission device 106 is configured to receive or transmit data via a network. The preceding network may include a wireless network provided by a communication provider of the mobile terminal 10. In one example, the transmission device 106 includes a network interface controller (NIC), which may be connected to other network equipment via a base station and thus be capable of communicating with the Internet. In one example, the transmission device 106 may be a radio frequency (RF) module, which may communicate with the Internet in a wireless way.

Figure 2:
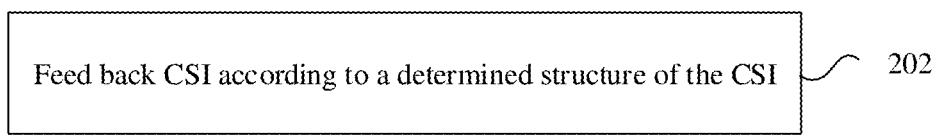
FIG. 2 is a flowchart of a method for feeding back CSI according to an embodiment.

An embodiment provides a method for feeding back channel information. FIG. 2 is a flowchart of the method for feeding back channel information according to the embodiment. As shown in FIG. 2, the method includes a step described below.

In step 202, CSI is fed back according to a determined structure of the CSI. The structure of the CSI includes M CSI subsets, where an m-th CSI subset among the M CSI subsets includes $k_m$ channel information components, the M CSI subsets include N CSI subsets, and an n-th CSI subset among the N CSI subsets includes $L_n$ channel information components which are determined by transforming a group of base vectors, where M is a positive integer, N is a positive integer less than or equal to M, m and n are both positive integers, $k_m$ is an integer greater than or equal to 0, and $L_n$ is an integer greater than or equal to 0 and less than or equal to $k_m$.

In the above step, a terminal feeds back the CSI according to the determined structure of the CSI, where the structure of the CSI includes the CSI subsets and the $L_n$ channel information components in the CSI subset are determined by transforming the group of base vectors.

Therefore, the method may solve the problem in the related technology that a correlation between multiple panels of antennas cannot be well fed back and inter-layer orthogonality cannot be guaranteed through a multi-layer linear combination codebook, feed back the correlation between the multiple panels of antennas, and guarantee the inter-layer orthogonality through the multi-layer linear combination codebook.

The above step may be executed by the terminal (which may include various terminals such as a data card, a mobile phone, a laptop computer, a personal computer, a tablet computer, a personal digital assistant, and Bluetooth, and may include various wireless communication apparatuses such as a relay, a remote apparatus and a wireless access point).

In an embodiment, the $k_m$ channel information components include at least one of: $B_m$ pieces of precoding indication information, where $B_m$ is an integer greater than or equal to 0; $A_m$ pieces of weighting coefficient amplitude indication information, where $A_m$ is an integer greater than or equal to 0; $P_m$ pieces of weighting coefficient phase indication information, where $P_m$ is an integer greater than or equal to 0; or $R_m$ pieces of beam indication information, where $R_m$ is an integer greater than or equal to 0.

In an embodiment, $B_m$, $A_m$, $P_m$ and $R_m$ may have a same value or different values. A beam may be a resource (such as precoding at a transmitting end, precoding at a receiving end, an antenna port, an antenna weight vector and an antenna weight matrix). A beam identifier (ID) may be replaced with a resource ID because the beam may be bound to some time-frequency code resources for transmission. The beam may alternatively be a transmission (sending or receiving) mode. The transmission mode may include space multiplexing, frequency domain diversity (or time domain diversity) and the like.

In an embodiment, in the CSI subset, information indicated by the $A_m$ pieces of weighting coefficient amplitude indication information and information indicated by the $P_m$ pieces of weighting coefficient phase indication information constitute a weighting coefficient vector, and weighting coefficient vectors of at least one group of CSI subsets are orthogonal to each other, where $A_m$ and $P_m$ are both integers greater than or equal to 0.

In an embodiment, the CSI subsets are determined according to at least one of: groups of measurement pilot resources; groups of measurement pilot ports; groups of demodulation pilot resources; groups of demodulation pilot ports; or layers. In an embodiment, the layer may be a high layer (for example, a link layer), or may be a physical layer.

In an embodiment, a manner for determining the CSI subsets is determined through at least one of: a high-layer signaling or a physical layer signaling.

In an embodiment, information indicated by $b_m$ pieces of precoding indication information included in the $B_m$ pieces of precoding indication information is determined in at least one of manners described below:

an angular rotation is performed on information indicated by $b_n$ pieces of precoding indication information in the n-th CSI subset;

an amplitude expansion is performed on the information indicated by the $b_n$ pieces of precoding indication information in the n-th CSI subset;

a phase transformation is performed on the information indicated by the $b_n$ pieces of precoding indication information in the n-th CSI subset, where $b_m$ and $b_n$ are both positive integers, and $b_m$ is less than or equal to $B_m$.

In an embodiment, the angular rotation is performed by acting an angular rotation matrix on the information indicated by the precoding indication information. The angular rotation matrix includes at least one of: an identity matrix; a first diagonal matrix whose diagonal elements constitute a DFT vector; or a second diagonal matrix whose diagonal elements constitute a Kronecker product of S DFT vectors, where an s-th DFT vector among the S DFT vectors corresponds to an s-th piece of angular rotation information, where S is a positive integer greater than 1, and s is a positive integer greater than or equal to 1 and less than or equal to S.

In an embodiment, information indicated by precoding indication information in at least two CSI subsets included in the CSI subsets has same information on at least one of: the angular rotation, the amplitude expansion or the phase transformation. In an embodiment, precoding indication information in multiple CSI subsets included in the CSI subsets has information on at least one of: the angular rotation, the amplitude expansion or the phase transformation.

In an embodiment, a value of $b_m$ is determined through at least one of: a high-layer signaling or a physical layer signaling; or a first agreement. In an embodiment, the value of $b_m$ may be determined through at least one of: the high-layer signaling or the physical layer signaling.

In an embodiment, the first agreement includes that $b_m$ is equal to $B_m$. In an embodiment, the first agreement may be reached between the terminal and a base station.

In an embodiment, at least one of a frequency domain feedback granularity of the angular rotation, a frequency domain feedback granularity of the amplitude expansion, a frequency domain feedback granularity of the phase transformation, a minimum variation unit of the angular rotation, a minimum variation unit of the amplitude expansion, or a minimum variation unit of the phase transformation is determined through at least one of: a high-layer signaling or a physical layer signaling; or a second agreement. The frequency domain feedback granularity includes at least one of a subband feedback or a bandwidth feedback. In the embodiment, the second agreement may be reached between the terminal and the base station.

In an embodiment, the second agreement includes at least one of: a wideband feedback for the angular rotation; a wideband feedback for the amplitude expansion; or a subband feedback for the phase transformation.

In an embodiment, a feedback period of at least one of the angular rotation, the amplitude expansion or the phase transformation is determined through at least one of: a high-layer signaling or a physical layer signaling; or a third agreement. In an embodiment, the third agreement may be reached between the terminal and the base station.

In an embodiment, the third agreement includes that the feedback period of at least one of the angular rotation, the amplitude expansion or the phase transformation is consistent with a feedback period of the $b_n$ pieces of precoding indication information in the n-th CSI subset.

In an embodiment, the method further includes determining and reporting at least one of: the minimum variation unit of at least one of the angular rotation, the amplitude expansion or the phase transformation; the frequency domain feedback granularity of at least one of the angular rotation, the amplitude expansion or the phase transformation; or the feedback period of at least one of the angular rotation, the amplitude expansion or the phase transformation.

In an embodiment, the CSI includes at least one of the precoding indication information or the beam indication information, and at least one of information indicated by the precoding indication information or information indicated by the beam indication information of a k-th pilot resource group and a k-th pilot port group at an h-th layer is determined by performing at least one of the angular rotation, the amplitude expansion or the phase transformation on the group of base vectors. In an embodiment, k may be a positive integer.

In an embodiment, the group of base vectors includes one of: a vector in an identity matrix; or multiple column vectors in the identity matrix.

In an embodiment, the CSI includes the precoding indication information or the beam indication information, and the information indicated by the precoding indication information or the information indicated by the beam indication information of at least one of the k-th pilot resource group or the k-th pilot port group at the h-th layer has at least one of characteristics described below:

the information indicated by the precoding indication information or the information indicated by the beam indication information of each layer or each pilot resource group or each pilot port group is independently determined by the base vectors;

the information indicated by the precoding indication information or the information indicated by the beam indication information of different pilot resource groups or different pilot port groups at a same layer is determined by a same base vector;

the information indicated by the precoding indication information or the information indicated by the beam indication information of a same pilot resource group or a same pilot port group at different layers is independently determined by the base vectors;

the information indicated by the precoding indication information or the information indicated by the beam indication information of the same pilot resource group or the same pilot port group at the different layers is determined by the same base vector;

the information indicated by the precoding indication information or the information indicated by the beam indication information of the different pilot resource groups or the different pilot port groups at the same layer is independently determined by the base vectors;

the CSI at the same layer selects the precoding indication information or the beam indication information corresponding to a feedback of a partial resource or port; or the CSI at the different layers selects different resources or ports, and the precoding indication information or the beam indication information of the CSI at the different layers is independently determined by the group of base vectors.

In an embodiment, in the CSI at the h-th layer, at least one of information indicated by weighting coefficient amplitude indication information or information indicated by weighting coefficient phase indication information is determined by performing at least one of the angular rotation or the phase transformation on the group of base vectors, where h is an integer greater than or equal to 1.

In an embodiment, the group of base vectors is determined through at least one of: the high-layer signaling; the physical layer signaling; or a fourth agreement. In an embodiment, the fourth agreement may be reached between the terminal and the base station.

In an embodiment, the fourth agreement includes one of: selecting q columns of the identity matrix at a Q-th layer of the CSI to perform at least one of the angular rotation or the phase transformation, where the q columns include at least one of first $q_1$ columns or last $q_1$ columns; or performing at least one of the angular rotation or the phase transformation on different port groups at an X-th layer of the CSI according to x columns of the identity matrix, where the x columns include at least one of first $x_1$ columns or last $x_1$ columns. In an embodiment, $q_1$ and $x_1$ may be the same, and the Q-th layer of the CSI and the X-th layer of the CSI may be a same layer.

In an embodiment, the angular rotation and the phase transformation include acting a transformation matrix on one or more vectors in the group of base vectors. The transformation matrix includes at least one of t phase transformation matrices or a product of r angular rotation matrices, where t and r are both greater than or equal to 1.

In an embodiment, each of the phase transformation matrices is a diagonal matrix, where a diagonal element of the diagonal matrix includes at least one of: a positive real number; or a natural exponential function of a complex number.

In an embodiment, at least one of characteristics described below is included:

the CSI at each layer corresponds to at least one of the phase transformation matrices, where the phase transformation matrix corresponding to the CSI at the h-th layer includes at least f(h) diagonal elements of 1, where f (h) is a positive integer function of 1, and f(h) is less than or equal to 1; or the CSI at the each layer corresponds to at least one of the angular rotation matrices, where the angular rotation matrix corresponding to the CSI at the h-th layer is determined by transforming at least one of elements in a g(h)-th row and an n-th column, elements in an n-th row and a g(h)-th column, elements in the g(h)-th row and the g(h)-th column, or elements in the n-th row and the n-th column in the identity matrix, where g(h) and n are both greater than or equal to 1, n is not equal to g(h), g(h) is a positive integer function of h, and a trigonometric function of a real number is obtained after the elements are transformed.

In an embodiment, f(h) and g(h) may be the same or different.

In an embodiment, a number of angular rotation matrices corresponding to the CSI at the each layer decreases with an increase of a number of layers of the angular rotation matrix.

In an embodiment, at least one of a frequency domain feedback granularity of information in the phase transformation matrix, a frequency domain feedback granularity of information in the angular rotation matrix, a feedback period of the information in the phase transformation matrix, a feedback period of the information in the angular rotation matrix, a minimum variation unit of the information in the phase transformation matrix or a minimum variation unit of the information in the angular rotation matrix is determined through at least one of: a high-layer signaling; a physical layer signaling; or a fifth agreement. In an embodiment, the fifth agreement may be reached between the terminal and the base station.

In an embodiment, the fifth agreement includes at least one of: a wideband feedback of the information in the angular rotation matrix; a subband feedback of the information in the phase transformation matrix; the feedback period of the information in the angular rotation matrix being C times the feedback period of the information in the phase transformation matrix, where C is a positive integer; or the information in the angular rotation matrix having at least one of a same feedback period or a same frequency domain feedback granularity as precoding indication information in a corresponding CSI subset.

In an embodiment, the method further includes determining and reporting at least one of: the frequency domain feedback granularity of the information in the phase transformation matrix; the frequency domain feedback granularity of the information in the angular rotation matrix; the feedback period of the information in the phase transformation matrix; the feedback period of the information in the angular rotation matrix; the minimum variation unit of the information in the phase transformation matrix; or the minimum variation unit of the information in the angular rotation matrix.

In an embodiment, the CSI at the same layer has at least two port groups with at least one of same phase transformation information or same angular rotation information.

In an embodiment, for the CSI of different port groups, at least one of the phase transformation information or the angular rotation information is fed back in at least one of the following manners: at least one of the phase transformation information or the angular rotation information is separately fed back for the different port groups; or at least one of the phase transformation information or the angular rotation information is jointly fed back for the different port groups.

Figure 3:
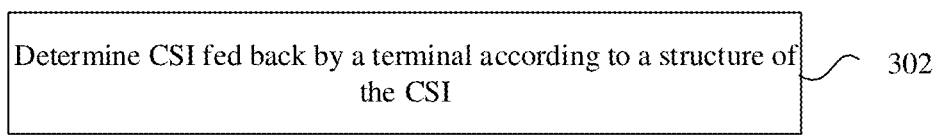
FIG. 3 is a flowchart of a method for determining CSI according to an embodiment.

An embodiment provides a method for feeding back channel information. FIG. 3 is a flowchart of a method for determining CSI according to an embodiment of the present disclosure. As shown in FIG. 3, the method includes a step described below.

In step 302, CSI fed back by a terminal is determined according to a structure of the CSI. A specific structure of the CSI includes M CSI subsets, where an m-th CSI subset among the M CSI subsets includes $k_m$ channel information components, the M CSI subsets include N CSI subsets, and an n-th CSI subset among the N CSI subsets includes $L_n$ channel information components which are determined by transforming a group of base vectors, where M is a positive integer, N is a positive integer less than or equal to M, m and n are both positive integers, $k_m$ is an integer greater than or equal to 0, and $L_n$ is an integer greater than or equal to 0 and less than or equal to $k_m$.

In the above step, a base station feeds back the CSI according to the determined structure of the CSI, where the structure of the CSI includes the CSI subsets and the $L_n$ channel information components in the CSI subset are determined by performing at least one of angular rotation, phase transformation or amplitude expansion on the group of base vectors in a linear space.

Therefore, the method may solve the problem in the related technology that a correlation between multiple panels of antennas cannot be well fed back and inter-layer orthogonality cannot be guaranteed through a multi-layer linear combination codebook, feed back the correlation between the multiple panels of antennas, and guarantee the inter-layer orthogonality through the multi-layer linear combination codebook.

The above step may be executed by the base station (which may be various wireless communication apparatus such as a macro base station, a micro base station, or a wireless access point).

In an embodiment, the $k_m$ channel information components include at least one of: $B_m$ pieces of precoding indication information, where $B_m$ is an integer greater than or equal to 0; $A_m$ pieces of weighting coefficient amplitude indication information, where $A_m$ is an integer greater than or equal to 0; $P_m$ pieces of weighting coefficient phase indication information, where $P_m$ is an integer greater than or equal to 0; or $R_m$ pieces of beam indication information, where $R_m$ is an integer greater than or equal to 0.

In an embodiment, in the CSI subset, information indicated by the $A_m$ pieces of weighting coefficient amplitude indication information and information indicated by the $P_m$ pieces of weighting coefficient phase indication information constitute a weighting coefficient vector, and weighting coefficient vectors of at least one group of CSI subsets are orthogonal to each other, where $A_m$ and $P_m$ are both integers greater than or equal to 0.

In an embodiment, the CSI subsets are determined according to at least one of: groups of measurement pilot resources; groups of measurement pilot ports; groups of demodulation pilot resources; groups of demodulation pilot ports; or layers.

In an embodiment, a manner for determining the CSI subsets is determined by at least one of: notifying the terminal to determine the manner via a high-layer signaling; or notifying the terminal to determine the manner via a physical layer signaling.

In an embodiment, information indicated by $b_m$ pieces of precoding indication information included in the $B_m$ pieces of precoding indication information is determined by at least one of: performing the angular rotation on information indicated by $b_n$ pieces of precoding indication information in the n-th CSI subset; performing the amplitude expansion on the information indicated by the $b_n$ pieces of precoding indication information in the n-th CSI subset; or performing the phase transformation on the information indicated by the $b_n$ pieces of precoding indication information in the n-th CSI subset; where $b_m$ and $b_n$ are both positive integers, and $b_m$ is less than or equal to $B_m$.

In an embodiment, the angular rotation is performed by acting an angular rotation matrix on the information indicated by the precoding indication information. The angular rotation matrix 5 includes at least one of: an identity matrix; a first diagonal matrix whose diagonal elements constitute a DFT vector; or a second diagonal matrix whose diagonal elements constitute a Kronecker product of S DFT vectors, where an s-th DFT vector among the S DFT vectors corresponds to an s-th piece of angular rotation information, where S is a positive integer greater than 1, and s is a positive integer greater than or equal to 1 and less than or equal to S.

In an embodiment, information indicated by precoding indication information in at least two CSI subsets included in the CSI subsets has same information on at least one of: the angular rotation, the amplitude expansion or the phase transformation.

In an embodiment, a value of $b_m$ is determined by at least one of: notifying the terminal to determine the value of $b_m$ via the high-layer signaling; notifying the terminal to determine the value of $b_m$ via the physical layer signaling; or a first agreement.

In an embodiment, the first agreement includes that $b_m$ is equal to $B_m$.

In an embodiment, at least one of a frequency domain feedback granularity of the angular rotation, a frequency domain feedback granularity of the amplitude expansion, a frequency domain feedback granularity of the phase transformation, a minimum variation unit of the angular rotation, a minimum variation unit of the amplitude expansion, or a minimum variation unit of the phase transformation is determined by at least one of: notifying the terminal to perform determination via a high-layer signaling or a physical layer signaling; or a second agreement. The frequency domain feedback granularity includes at least one of a subband feedback or a bandwidth feedback.

In an embodiment, the second agreement includes at least one of: a wideband feedback for the angular rotation; a wideband feedback for the amplitude expansion; or a subband feedback for the phase transformation.

In an embodiment, a feedback period of at least one of the angular rotation, the amplitude expansion or the phase transformation is determined by at least one of: notifying the terminal to determine the feedback period via the high-layer signaling or the physical layer signaling; or a third agreement.

In an embodiment, the third agreement includes that the feedback period of at least one of the angular rotation, the amplitude expansion or the phase transformation is consistent with a feedback period of the $b_n$ pieces of precoding indication information in the n-th CSI subset.

In an embodiment, the method further includes receiving at least one of: the minimum variation unit of at least one of the angular rotation, the amplitude expansion or the phase transformation; the frequency domain feedback granularity of at least one of the angular rotation, the amplitude expansion or the phase transformation; or the feedback period of at least one of the angular rotation, the amplitude expansion or the phase transformation.

In an embodiment, the CSI includes at least one of the precoding indication information or the beam indication information, and at least one of information indicated by the precoding indication information or information indicated by the beam indication information of a k-th pilot resource group and a k-th pilot port group at an h-th layer is determined by performing at least one of the angular rotation, the amplitude expansion or the phase transformation on the group of base vectors. In an embodiment, a beam may be a resource (such as precoding at a transmitting end, precoding at a receiving end, an antenna port, an antenna weight vector and an antenna weight matrix). A beam ID may be replaced with a resource ID because the beam may be bound to some time-frequency code resources for transmission. The beam may also be a transmission (sending or receiving) mode. The transmission mode may include space multiplexing, frequency domain diversity (or time domain diversity) and the like.

In an embodiment, the group of base vectors includes one of: a vector in an identity matrix; or a plurality of column vectors in the identity matrix.

In an embodiment, the CSI includes the precoding indication information or the beam indication information, and the information indicated by the precoding indication information or the information indicated by the beam indication information of at least one of the k-th pilot resource group or the k-th pilot port group at the h-th layer has at least one of characteristics described below:

the information indicated by the precoding indication information or the information indicated by the beam indication information of each layer or each pilot resource group or each pilot port group is independently determined by the base vectors;

the information indicated by the precoding indication information or the information indicated by the beam indication information of different pilot resource groups or different pilot port groups at a same layer is determined by a same base vector;

the information indicated by the precoding indication information or the information indicated by the beam indication information of a same pilot resource group or a same pilot port group at different layers is independently determined by the base vectors;

the information indicated by the precoding indication information or the information indicated by the beam indication information of the same pilot resource group or the same pilot port group at the different layers is determined by the same base vector;

the information indicated by the precoding indication information or the information indicated by the beam indication information of the different pilot resource groups or the different pilot port groups at the same layer is independently determined by the base vectors;

the CSI at the same layer selects the precoding indication information or the beam indication information corresponding to a feedback of a partial resource or port; or the CSI at the different layers selects different resources or ports, and the precoding indication information or the beam indication information of the CSI at the different layers is independently determined by the group of base vectors.

In an embodiment, the beam may be the resource (such as precoding at the transmitting end, precoding at the receiving end, the antenna port, the antenna weight vector and the antenna weight matrix). The beam ID may be replaced with the resource ID because the beam may be bound to some time-frequency code resources for transmission. The beam may also be the transmission (transmitting or receiving) mode. The transmission mode may include space multiplexing, frequency domain diversity (or time domain diversity) and the like.

In an embodiment, in the CSI at the h-th layer, at least one of information indicated by weighting coefficient amplitude indication information or information indicated by weighting coefficient phase indication information is determined by performing at least one of the angular rotation or the phase transformation on the group of base vectors, where h is an integer greater than or equal to 1.

In an embodiment, the group of base vectors is determined by at least one of: notifying the terminal to determine the group of base vectors via a high-layer signaling; notifying the terminal to determine the group of base vectors via a physical layer signaling; or a fourth agreement.

In an embodiment, the fourth agreement includes one of: selecting q columns of the identity matrix at a Q-th layer of the CSI to perform at least one of the angular rotation or the phase transformation, where the q columns include at least one of first $q_1$ columns or last $q_1$ columns; or performing at least one of the angular rotation or the phase transformation on different port groups at an X-th layer of the CSI according to x columns of the identity matrix, where the x columns include at least one of first $x_1$ columns or last $x_1$ columns.

In an embodiment, at least one of the angular rotation or the phase transformation includes acting a transformation matrix on one or more vectors in the group of base vectors. The transformation matrix includes at least one of t phase transformation matrices or a product of r angular rotation matrices, where t and r are both greater than or equal to 1.

In an embodiment, each of the phase transformation matrices is a diagonal matrix, where a diagonal element of the phase transformation matrix includes at least one of: a positive real number; or a natural exponential function of a complex number.

In an embodiment, at least one of characteristics described below is included.

The CSI at each layer corresponds to at least one of the phase transformation matrices, where the phase transformation matrix corresponding to the CSI at the h-th layer includes at least f(h) diagonal elements of 1, where f (h) is a positive integer function of 1, and f(h) is less than or equal to 1.

The CSI at the each layer corresponds to at least one of the angular rotation matrices, where the angular rotation matrix corresponding to the CSI at the h-th layer is determined by transforming at least one of elements in a g(h)-th row and an n-th column, elements in an n-th row and a g(h)-th column, elements in the g(h)-th row and the g(h)-th column, or elements in the n-th row and the n-th column in the identity matrix, where g(h) and n are both greater than or equal to 1, n is not equal to g(h), g(h) is a positive integer function of h, and a trigonometric function of a real number is obtained after the elements are transformed.

In an embodiment, a number of angular rotation matrices corresponding to the CSI at the each layer decreases with an increase of a number of layers of the angular rotation matrix.

In an embodiment, at least one of a frequency domain feedback granularity of information in the phase transformation matrix, a frequency domain feedback granularity of information in the angular rotation matrix, a feedback period of the information in the phase transformation matrix, a feedback period of the angular rotation matrix, a minimum variation unit of the phase transformation matrix or a minimum variation unit of the information in the angular rotation matrix is determined by at least one of: notifying the terminal to perform determination via a high-layer signaling; notifying the terminal to perform determination via a physical layer signaling; or a fifth agreement.

In an embodiment, the fifth agreement includes at least one of: a wideband feedback of the information in the angular rotation matrix; a subband feedback of the information in the phase transformation matrix; a feedback period of the information in the angular rotation matrix being C times the feedback period of the information in the phase transformation matrix, where C is a positive integer; or the information in the angular rotation matrix having at least one of a same feedback period or a same frequency domain feedback granularity as precoding indication information in a corresponding CSI subset.

In an embodiment, the method further includes receiving at least one of: the frequency domain feedback granularity of the information in the phase transformation matrix; the frequency domain feedback granularity of the information in the angular rotation matrix; the feedback period of the information in the phase transformation matrix; the feedback period of the information in the angular rotation matrix; a minimum variation unit of the information in the phase transformation matrix; or the minimum variation unit of the information in the angular rotation matrix.

In an embodiment, the CSI at the same layer has at least two port groups with at least one of same phase transformation information or same angular rotation information.

In an embodiment, for the CSI of different port groups, at least one of the phase transformation information or the angular rotation information fed back by the terminal is received in at least one of the following manners: at least one of the phase transformation information or the angular rotation information is separately fed back for the different port groups; or at least one of the phase transformation information or the angular rotation information is jointly fed back for the different port groups.

Figure 4:
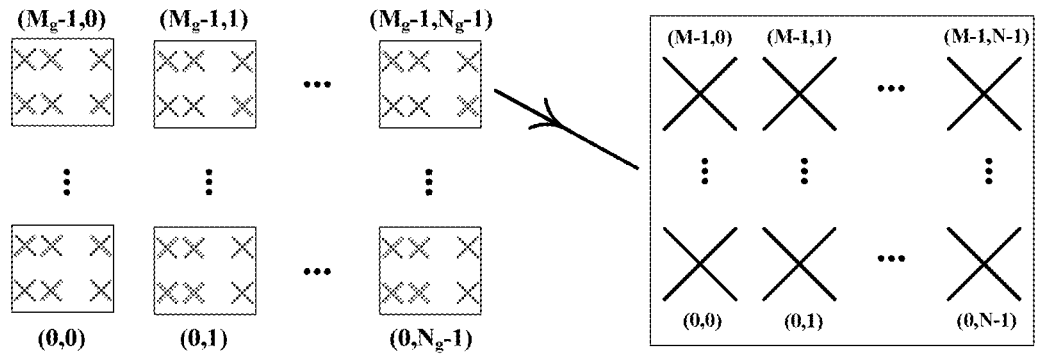
FIG. 4 is a schematic diagram of a multi-panel large-scale antenna array according to an embodiment.

An embodiment provides a manner for implementing channel information quantification and feedback under multiple panels. In a 5G technology, FIG. 4 is a schematic diagram of a multi-panel large-scale antenna array in the embodiment. As shown in FIG. 4, a manner for configuring the multi-panel large-scale antenna array at a base station end has been extensively researched. In FIG. 4, the whole planar antenna array includes $M_g N_g$ panels, where each panel includes MN ports. Antenna ports on each panel are distributed at an equal spacing and adjacent antenna panels are distributed at an equal distance. However, a distance between adjacent ports on the adjacent antenna panels is not necessarily equal to the spacing between antennas on each panel. Therefore, a correlation between antennas on different panels is not equivalent to a correlation between antennas on the same panel. A codebook design in the related technology in which a 1D or 2D discrete Fourier transform (DFT) vector is used for quantifying correlations between all ports is no longer applicable to the multi-panel antenna array.

An embodiment provides a case of a codebook design for the multi-panel antenna array under a framework of a linear combination codebook. As for the antenna array in FIG. 4, a spatial correlation between antennas on different panels may be quantified by the DFT vector. For a single panel with a total of T ports, CSI may be accurately fed back with the linear combination codebook. Taking linear combination precoding with a rank of 1 is taken as an example and assuming that a dual-polarized antenna array has K panels, N beams are selected in each polarization direction, on a k-th panel, a precoding matrix in an i-th polarization direction is $a_1^{k,i}b_1^{(k,i)} + a_2^{k,i}b_2^{(k,i)} + \ldots + a_N^{k,i}b_N^{(k,i)}$, where $i=\{1, 2\}$, $b_1^{(k,i)}, \ldots, b_N^{(k,i)}$ denote N orthogonal beams selected in a polarization direction i of the k-th panel, and $a_n^{k,i}$ denotes a weighting coefficient including an amplitude and a phase of an n-th beam of the k-th panel in the polarization direction i. The linear combination precoding is performed for all panels and polarization directions and final precoding matrix is written as follows:

$$W = \begin{bmatrix} a_1^{1,1}b_1^{(1,1)} + a_2^{1,1}b_2^{(1,1)} + \ldots + a_N^{1,1}b_N^{(1,1)} \\ \vdots \\ a_1^{K,1}b_1^{(K,1)} + a_2^{K,1}b_2^{(K,1)} + \ldots + a_N^{K,1}b_N^{(K,1)} \\ a_1^{1,2}b_1^{(1,2)} + a_2^{1,2}b_2^{(1,2)} + \ldots + a_N^{1,2}b_N^{(1,2)} \\ \vdots \\ a_1^{K,2}b_1^{(K,2)} + a_2^{K,2}b_2^{(K,2)} + \ldots + a_N^{K,2}b_N^{(K,2)} \end{bmatrix} =$$

$$\begin{bmatrix} b_1^{(1,1)}, b_2^{(1,1)}, \ldots, b_N^{(1,1)} & & \\ & \ddots & \\ & & b_1^{(K,2)}, b_2^{(K,2)}, \ldots, b_N^{(K,2)} \end{bmatrix} \begin{bmatrix} a_1^{1,1} \\ \vdots \\ a_N^{K,2} \end{bmatrix} = W_1 W_2$$

In an embodiment, when precoding information is calculated through the above precoding structure, a method of relatively low complexity is to calculate a beam matrix $W_1$ and calculate an optimal set $W_2$ of weighting coefficients according to $W_1$. A combined beam calculation for all the panels has relatively large complexity. If an independent beam is calculated for each panel, a correlation between panels cannot be reflected on the beam selection, which may cause performance losses. For example, in an extreme case, beams selected for multiple panels are orthogonal to each other, and the correlation between different panels cannot be reflected by adjusting the weighting coefficients. Therefore, a manner for controlling the correlation between different panels without causing large feedback overheads and processing complexity is to impose a certain limitation on a base sequence between different panels, that is, impose a certain limitation on beam selections for the different panels. A precoding construction manner is as follows: after the N beams are selected for a first panel in $W_1$, the beam selection of the k-th panel has the following model $[b_1^{(k,i)}, \ldots, b_N^{(k,i)}] = Q_k[b_1^{(1,i)}, \ldots, b_N^{(1,i)}]$, where $Q_k$ denotes an angular rotation matrix for the N beams, for example, a diagonal matrix in the following form:

$$Q_k = \begin{cases} I_T, & k = 1 \\ \text{diag}\left\{1, \ldots, \exp\left(j\frac{T-1}{T}q_k\right)\right\}, & k > 1 \end{cases};$$

where $q_k$ denotes an angular rotation matrix of the k-th panel. For example, $q_k = m_k q$, where $m_k$ is a positive integer and q is a minimum variation unit of angular rotation, which may be configured via signaling by a network or may be a fixed value through an agreement. In addition, when a port on the panel is a two-dimensional array, diagonal elements of $Q_k$ are a Kronecker product of two DFT vectors which respectively correspond to angular rotation information in a first dimension and angular rotation information in a second dimension. It can be seen from the above formula that the diagonal elements of the angular rotation matrix constitute the DFT vector. If the beam selection of the first panel is regarded as a group of bases in a channel matrix space, the beam selection of another panel is a result obtained by performing the angular rotation on the group of bases. After a terminal performs a channel estimation with the above structure, $m_k$ and the weighting coefficients may be calculated to control the correlation between different panels, that is, joint processing of the multiple panels starts from the beam selections, which has low computational complexity, reduces feedback overheads and guarantee feedback performance. In addition, for ports in two polarization directions of the same panel, since respective paths may be considered to be the same in theory, a simpler processing manner is to consider the beam selections in different polarization directions of the same panel as the same to reduce complexity and overheads, that is, $$[b_1^{(k,1)}, \ldots, b_N^{(k,1)}] = [b_1^{(k,2)}, \ldots, b_N^{(k,2)}].$$

In this case, two port groups in different polarization directions of the same panel have the same angular rotation with respect to a reference beam selection.

In the preceding precoding structure, the beam selection of each panel is correlated to each other. In an embodiment, for the multiple panels, some beam selections are correlated and some beam selections are independent. For the k-th panel, only $N_k$ beams among the N beams are obtained by performing the angular rotation on the beam selection of the first panel, that is, the beam selection of the kth panel is written as follows:

$$[b_1^{(k,i)}, \ldots, b_{N_k}^{(k,i)}] = [Q_k[b_1^{(1,i)}, \ldots, b_{N_k}^{(1,i)}],$$
$$b_{N_k+1}^{(1,i)}, \ldots, b_N^{(1,i)}].$$

In this case, the correlation between different panels can still be optimized through the beam selections. A value of $N_k$ may be configured by a base station via a high-layer signaling or a physical layer signaling. In addition, when a linear combination feedback is not used and only a DFT codeword corresponding to a single path is fed back, a feedback of the angular rotation between different panels with $Q_k$ may be equivalent to a differential precoding indication information feedback with reference to a reference panel.

In the preceding precoding structure, a feedback of the beam selections of the multiple panels further includes angular rotation indication information $Q_k$ in addition to the precoding indication information feedback. The network may configure a time-frequency domain feedback granularity (including a wideband feedback and a subband feedback) and a feedback period of the angular rotation information via signaling. The terminal may also determine the time-frequency domain feedback granularity according to an agreement with the base station. Since the beam selections may be determined with $Q_k$, it may be agreed that $Q_k$ has the same time-frequency domain feedback granularity as precoding indication information. In addition, a variation of $Q_k$ is related to a long-term channel characteristic and may be considered by default as the wideband feedback. Since the terminal may obtain variation characteristics of different channel information parameters through measurement, the terminal may determine the time-frequency domain feedback granularity and report it to the base station.

An embodiment provides a manner for implementing channel information quantification under multiple panels. In the preceding embodiments, the angular rotation is performed on beams to obtain beams of different panels. In addition to the angular rotation, phase transformation and amplitude expansion may also be performed to vary the beams. For example, precoding of the k-th panel in the polarization direction i may be denoted as:

$$[b_1^{(k,i)}, \ldots, b_N^{(k,i)}]P_{k,i}\begin{bmatrix}a_1^{k,i}\\ \vdots \\ a_N^{k,i}\end{bmatrix};$$

where a matrix $P_{k,i}$ is a diagonal matrix used for performing the phase transformation and amplitude expansion on the beams of the k-th panel and in the following form:

$$P_{k,i} = \begin{bmatrix} p_1^{k,i}e^{j\phi_1^{k,i}} & & \\ & \ddots & \\ & & p_N^{k,i}e^{j\phi_N^{k,i}} \end{bmatrix};$$

where $p_1^{k,i}, \ldots, p_N^{k,i}$ denotes the amplitude expansion on the beams and $\phi_1^{k,i}, \ldots, \phi_N^{k,i}$ denotes the phase transformation on the beams. In this way, the precoding satisfies the following structure:

$$W = \begin{bmatrix} b_1^{(1,1)}, b_2^{(1,1)}, \ldots, b_N^{(1,1)} & & \\ & \ddots & \\ & & b_1^{(K,2)}, b_2^{(K,2)}, \ldots, b_N^{(K,2)} \end{bmatrix}$$

$$\begin{bmatrix} P_{1,1} & & \\ & \ddots & \\ & & P_{K,2} \end{bmatrix}\begin{bmatrix} a_N^{1,1} \\ \vdots \\ a_N^{K,2} \end{bmatrix} = W_1 W_2 W_3.$$

The preceding precoding matrix may be used for optimizing the spatial correlation in the CSI reported by different panels, and a feedback granularity of $W_1$, $W_2$ and $W_3$ may be set to optimize feedback overheads and feedback performance. A time-frequency domain feedback granularity of $W_2$ may be configured by the base station via the signaling or may be associated with a time-frequency domain feedback granularity of $W_1$ or $W_3$. For example, the time-frequency domain granularity of $W_2$ is the same as that of $W_1$ or is a positive integer multiple of that of $W_3$. Since the amplitude varies slowly and the phase varies quickly, the wideband feedback is used for the amplitude and the subband feedback is used for the phase by default. Since the terminal may obtain the variation characteristics of the different channel information parameters through measurement, the terminal may determine the time-frequency domain feedback granularity and report it to the base station.

An embodiment provides one manner for implementing channel information quantification under multiple panels. In an LTE Rel-13, two feedback manners are introduced, a feedback in a Class A based on an NP CSI-RS and a feedback in a Class B based on a BF CSI-RS. The Class A uses port merging precoding and the Class B uses port selection precoding. The preceding two embodiments may be regarded as pre-coding information acquisition through the feedback in the Class A. An embodiment provides a method for acquiring the CSI through the port selection precoding in the Class B under the multiple panels. For each panel, the base station converts the antenna ports into B virtualized CSI-RS ports with the BF CSI-RS and each port corresponds to one beam. The terminal feeds back the CSI by feeding back beam selection information and inter-panel correlation information. A new Class B codebook in the LTE Rel-13 may implement the function to some extent. However, a port group division in the Class B codebook in the Rel-13 is targeted to an antenna array in different polarization directions on the same panel. In addition, to reduce overheads, a design of the Class B codebook in the Rel-13 has a limitation that different layers or port groups use the same beam selection indication. In an embodiment, a codebook of with a rank of 2 and two port groups is taken as an example and the Class B codebook is in the following form:

$$W = \begin{bmatrix} W_{1,1} & W_{1,2} \\ \alpha_1 W_{2,1} & \alpha_2 W_{2,2} \end{bmatrix};$$

where $W_{i,j}$ is a port selection codeword of an i-th port group at a j-th layer and may be a column of an identity matrix, and is used for selecting one port from multiple virtualized ports and reporting the one port to represent the beam selected by the terminal. In addition, $\alpha_j$ denotes feedback information of a correlation between the two port groups on the j-th layer and includes at least amplitude information and phase information which respectively represent information for performing the amplitude expansion on the precoding selected by $W_{i,j}$ and information for performing the phase transformation on the precoding selected by $W_{i,j}$. The above formula shows a most general structure of the Class B codebook for multiple port groups, that is, the beam selection is performed independently for each layer and each port group. Under some conditions, the preceding structure may be simplified or limited to reduce the feedback overheads. If the port group division is performed according to different polarization directions, it may be considered that beam directions seen by different port groups are the same, that is, different port groups see the same beam and different layers may see different beams. For some panels closer to each other, it can be considered that different port groups have consistent beam selection. For panels far away from each other, it may be considered that the beam selections of different panels are independently performed and it is limited that different layers have the same beam selection to reduce overheads. When different port groups are distributed in different stations, that is, multiple stations perform cooperative communications, a correlation between different stations may be ignored. Therefore, $W_{1,2}=0$, $W_{2,1}=0$, and beam selections of different stations are performed independently. With the preceding precoding structure, beam information in the port group and information on the correlation between port groups may be fed back in a manner of Class B.

An embodiment provides a manner for implementing a feedback of a linear combination codebook. The feedback of the linear combination codebook constructs high-accuracy channel information feedback by linearly weighting and combining beams based on multiple paths.

Therefore, overheads of the feedback of the linear combination codebook include beam-related precoding codeword information, weighting coefficient amplitude information and weighting coefficient phase information.

In the related technology, the linear combination codebook selects orthogonal beams and the selection of weighting coefficients is not optimized and limited. Therefore, when a number of layers is greater than 1, orthogonality between multiple layers cannot be guaranteed. In single-user MIMO, the orthogonality between multiple layers may better guarantee space division performance and thus better precoding gains may be obtained. In the embodiment, by imposing a limitation on the selection of the weighting coefficients, the orthogonality between multiple layers may be better guaranteed and feedback overheads of the weighting coefficients may be reduced.

For a two-layer codeword with N orthogonal beams selected, assuming that weighted amplitude and phase are independently calculated in polarization directions for each of L layers, precoding of any two layers $l_1$ and $l_2$ may be denoted as:

$$f_{l_1} = \begin{bmatrix} a_{1,1,l_1} v_1 + \ldots a_{N,1,l_1} v_N \\ a_{1,2,l_1} v_1 + \ldots a_{N,2,l_1} v_N \end{bmatrix}$$

$$f_{l_2} = \begin{bmatrix} a_{1,1,l_2} v_1 + \ldots a_{N,1,l_2} v_N \\ a_{1,2,l_2} v_1 + \ldots a_{N,2,l_2} v_N \end{bmatrix};$$

where $v_1, \ldots, v_N$ denotes an orthogonal beam selected for each layer (beams selected in two polarization directions are the same) and $\alpha_{n,i,l}$ denotes a weighting coefficient (including the weighting coefficient phase information and the weighting coefficient magnitude information) of an n-th beam in an i-th polarization direction and at an l-th layer. To satisfy precoding orthogonality $f_{l_1}^H f_{l_2}$ between any layers, $$\sum_{n=1}^{N} \sum_{i=1}^{2} a_{n,i,l_1}^* = 0.$$

It can be seen from the above that when the same orthogonal beam group is selected, to satisfy precoding orthogonality between layers, vectors constituted by multiple layers of weighting coefficients are orthogonal to each other, that is, L column vectors of length 2N in a matrix A are orthogonal to each other. The matrix A is denoted as:

$$A = \begin{bmatrix} a_{1,1,1} & \cdots & a_{1,1,L} \\ \vdots & \ddots & \vdots \\ a_{N,2,1} & \cdots & a_{N,2,L} \end{bmatrix}.$$

Any L orthogonal vectors of length 2N may be parameterized with the following formula:

$$A = \left[ \prod_{m=1}^{L} \left( P_m \prod_{n=m+1}^{2N} U_{n,m} \right) \right] \cdot I(:, 1:L);$$

where $I(:,1:L)$ denotes first L columns of a 2N-dimensional identity matrix, $P_m$ denotes a phase transformation matrix which is a diagonal matrix as follows:

$$P_m = \text{diag}(1, \ldots 1, \exp(j\phi_{m,m+1}), \ldots, \exp(j\phi_{2N,m}));$$

where $U_{n,m}$ denotes an angular rotation matrix obtained by transforming an element in an n-th row and an n-th column, an element in an m-th row and an m-th column, an element in the n-th row and the m-th column, and an element in an n-th column and the m-th row in the 2N-dimensional identity matrix I into the following submatrix:

$$\begin{bmatrix} \cos(\theta_{n,m}) & \sin(\theta_{n,m}) \\ \sin(\theta_{n,m}) & -\cos(\theta_{n,m}) \end{bmatrix}.$$

In the above expression, $L(4N-L-1)/2$ pieces of phase transformation information $\phi_{n,m} \in [0, 2\pi]$ are correlated to the phase of the weighting coefficient and adopts the subband feedback; and $L(4N-L-1)/2$ pieces of angular rotation information $\theta_{n,m} \in [0, \pi/2]$ are correlated to the amplitude of the weighting coefficient and adopts the wideband feedback. In addition, a feedback period of the angular rotation may be an integer multiple of a feedback period of the phase transformation to reduce feedback overheads and signaling configuration overheads. When a linear combination feedback is constructed, the weighting coefficient satisfying the inter-layer orthogonality may be obtained by searching the codebook for $\phi_{n,m}$ and $\theta_{n,m}$. In addition, a total of $L(4N-L-1)$ parameters requires to be fed back, and $L(L+1)$ parameters are reduced compared with the feedback of the weighting coefficient without a limitation. Therefore, compared with the related technology, the solution satisfies the inter-layer orthogonality, reduces the feedback overheads, has close performance and may have gains without affecting flexibility of the subband and wideband feedbacks. In addition, when the phase transformation information and the angular rotation information are quantified and fed back, a minimum quantification unit determines a feedback accuracy and a number of required bits. The terminal may determine the minimum quantification unit according to a configuration of the base station or an agreement between the base station and the terminal. For example, the minimum quantification unit may be determined according to Quadrature Phase Shift Keying (QPSK) or 8PSK. On the other hand, the terminal has a better understanding of the channel characteristics through channel measurement, so the terminal may also determine a quantification range, the time-frequency domain feedback granularity and the like, and report the related information with the CSI to the base station.

An embodiment provides one manner for implementing the feedback of the linear combination codebook. The embodiment provides an optimized design of the feedback of the linear combination codebook with a large number of layers and limits the construction of the weighting coefficients to reduce the feedback overheads. Since amplitudes of multiple paths seen in different polarization directions may be approximately equal, weighting coefficient magnitudes in two polarization directions may be set to be equal. To guarantee the orthogonality between multiple layers in this case, the weighting coefficients may be parameterized separately in the two polarization directions, that is, each polarization direction i satisfies the following formula:

$$\sum_{n=1}^{N} a_{n,i,l_2}^* a_{n,i,l_1} = 0.$$

Precoding orthogonality between multiple layers may still be guaranteed. A weighting coefficient matrix Ai in each polarization direction is denoted as:

$$A_i = \begin{bmatrix} a_{1,i,1} & \cdots & a_{1,i,L} \\ \vdots & \ddots & \vdots \\ a_{N,i,1} & \cdots & a_{N,i,L} \end{bmatrix} = \left[\prod_{m=1}^{L}\left(P_m^{(i)} \prod_{n=m+1}^{N} U_{n,m}^{(i)}\right)\right] \cdot I_N(:,1:L);$$

where $I_N(:, 1: L)$ denotes first L columns of an N-dimensional identity matrix, $P_m^{(i)}$ denotes a phase transformation matrix and has the following expression:

$$P_m^{(i)} = \text{diag}(1, \ldots, 1, \exp(j\phi_{m,m+1}^{(i)}), \ldots, \exp(j\phi_{N,m+1}^{(i)}));$$

where $U_{n,m}^{(i)}$ denotes an angular rotation matrix obtained by transforming an element in an n-th row and an n-th column, an element in an m-th row and an m-th column, an element in the n-th row and the m-th column, and an element in an n-th column and the m-th row in the N-dimensional identity matrix into the following submatrix:

$$\begin{bmatrix} \cos(\theta_{n,m}^{(i)}) & \sin(\theta_{n,m}^{(i)}) \\ \sin(\theta_{n,m}^{(i)}) & -\cos(\theta_{n,m}^{(i)}) \end{bmatrix}.$$

The preceding precoding structure may be implemented by separately feeding back the angular rotation and the phase transformation of port groups in the two polarization directions. In addition, the same $\theta_{n,m}^{(i)}$ may be fed back for the two polarization directions so that the two polarization directions have the same weighting coefficient amplitude. In this way, with small performance losses, the feedback overheads of the weighting coefficients may be reduced and the same angular rotation information is fed back for at least two different port groups. On the other hand, with too large phase transformation overheads of the subband feedback, the same phase transformation may be performed in different polarization directions to reduce the overheads, that is, in the preceding expression, $\phi_{n,m}^{(i)} = \phi_{n,m}^{(j)}$ for different polarization directions i and j. At this time, the same phase transformation information is fed back for at least two different port groups.

An embodiment provides a manner for implementing a division of CSI subsets. Channel subsets may be determined in manner manners. One manner is to determine the channel subsets according to layers. When the terminal measures and reports the CSI, a channel rank may be obtained through the channel measurement and be fed back. The channel rank may represent a maximum number of transmission layers supportable by a radio channel. For the multiple panels or the linear combination feedback of the CSI, different layers may correspond to different channel information, and joint processing or an independent feedback between multiple layers will bring different performance. The orthogonality between multiple layers will bring a large difference to MIMO gains, for example, single-user MIMO gains. Therefore, the division of the channel subsets according to the layer and joint or independent optimization of multi-layer CSI may bring more performance gains.

In an embodiment, the channel subsets are determined according to a port group. This manner is applicable to an antenna array configuration with multiple panels, transmission nodes or polarization directions. Port groups corresponding to different polarization directions, transmission stations or panels may be jointly or independently optimized to improve MIMO transmission performance. The antenna port may be embodies as a measurement pilot port or a demodulation pilot port. Therefore, one manner of determining according to the port group is to determine the CSI subsets according to the measurement pilot port group, and the CSI is optimized for measurement pilot port groups corresponding to different panels, transmission stations or polarization directions during the channel measurement and feedback. Another manner of determining according to the port group is to determine the CSI subsets according to the demodulation pilot port group. Since a demodulation pilot and demodulation data have the same resource allocation, scheduling, precoding and the like and may better reflect an impact of a channel change during data transmission, a certain feedback of the CSI through demodulation pilot port groups corresponding to different panels, polarization directions and stations helps to monitor and adjust in real time a channel state during data transmission. The terminal may determine, according to a configuration signaling from the base station, whether to determine the channel subsets and perform the subsequent CSI calculation and feedback according to the measurement pilot port group or the demodulation pilot port group.

The methods in the embodiments described above may be implemented by software plus a general-purpose hardware platform, or may be implemented by hardware. The preceding solutions may be embodied in the form of a software product. The computer software product is stored in a storage medium (such as a read-only memory (ROM), a random access memory (RAM), a magnetic disk or an optical disk) and includes one or more instructions for enabling terminal apparatus (which may be a mobile phone, a computer, a server, network apparatus or the like) to execute the methods in the multiple embodiments described above.

An embodiment provides a device for feeding back channel information. The device may be configured to implement the embodiments described above. As used below, the term "module" may be at least one of software or hardware capable of implementing predetermined functions.

Figure 5:
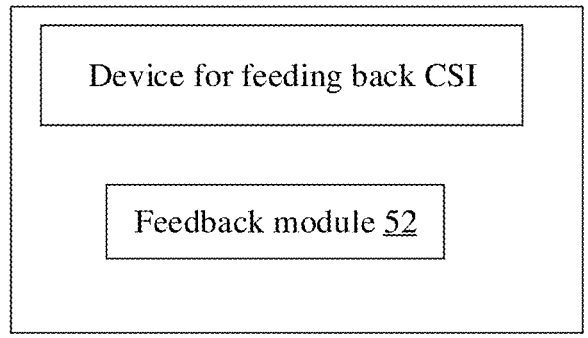
FIG. 5 is a block diagram of a device for feeding back CSI according to an embodiment.

FIG. 5 is a block diagram of a device for feeding back CSI according to an embodiment. As shown in FIG. 5, the device includes a feedback module 52.

The feedback module 52 is configured to feed back CSI according to a determined structure of the CSI. The structure of the CSI includes M CSI subsets, where an m-th CSI subset among the M CSI subsets includes $k_m$ channel information components, the M CSI subsets include N CSI subsets, and an n-th CSI subset among the N CSI subsets includes $L_n$ channel information components which are determined by transforming a group of base vectors, where M is a positive integer, N is a positive integer less than or equal to M, m and n are both positive integers, $k_m$ is an integer greater than or equal to 0, and $L_n$ is an integer greater than or equal to 0 and less than or equal to $k_m$.

In an embodiment, the $k_m$ channel information components include at least one of: $B_m$ pieces of precoding indication information, where $B_m$ is an integer greater than or equal to 0; $A_m$ pieces of weighting coefficient amplitude indication information, where $A_m$ is an integer greater than or equal to 0; $P_m$ pieces of weighting coefficient phase indication information, where $P_m$ is an integer greater than or equal to 0; or $R_m$ pieces of beam indication information, where $R_m$ is an integer greater than or equal to 0.

In an embodiment, in the CSI subset, information indicated by the $A_m$ pieces of weighting coefficient amplitude indication information and information indicated by the $P_m$ pieces of weighting coefficient phase indication information constitute a weighting coefficient vector, and weighting coefficient vectors of at least one group of CSI subsets are orthogonal to each other, where $A_m$ and $P_m$ are both integers greater than or equal to 0.

In an embodiment, the CSI subsets are determined according to at least one of: groups of measurement pilot resources; groups of measurement pilot ports; groups of demodulation pilot resources; groups of demodulation pilot ports; or layers.

In an embodiment, a manner for determining the CSI subsets is determined through at least one of: a high-layer signaling or a physical layer signaling.

In an embodiment, information indicated by $b_m$ pieces of precoding indication information included in the $B_m$ pieces of precoding indication information may be determined by at least one of: performing an angular rotation on information indicated by $b_n$ pieces of precoding indication information in the n-th CSI subset; performing an amplitude expansion on the information indicated by the $b_n$ pieces of precoding indication information in the n-th CSI subset; or performing a phase transformation on the information indicated by the $b_n$ pieces of precoding indication information in the n-th CSI subset; where $b_m$ and $b_n$ are both positive integers, and $b_m$ is less than or equal to $B_m$.

In an embodiment, the angular rotation is performed by acting an angular rotation matrix on the information indicated by the precoding indication information. The angular rotation matrix may include at least one of: an identity matrix; a first diagonal matrix whose diagonal elements constitute a DFT vector; or a second diagonal matrix whose diagonal elements constitute a Kronecker product of S DFT vectors, where an s-th DFT vector among the S DFT vectors corresponds to an s-th piece of angular rotation information, where S is a positive integer greater than 1, and s is a positive integer greater than or equal to 1 and less than or equal to S.

In an embodiment, information indicated by precoding indication information in at least two CSI subsets included in the CSI subsets has same information on at least one of: the angular rotation, the amplitude expansion or the phase transformation.

In an embodiment, a value of $b_m$ may be determined through at least one of: the high-layer signaling or the physical layer signaling; or a first agreement.

In an embodiment, the first agreement may include that $b_m$ is equal to $B_m$.

In an embodiment, at least one of a frequency domain feedback granularity of the angular rotation, a frequency domain feedback granularity of the amplitude expansion, a frequency domain feedback granularity of the phase transformation, a minimum variation unit of the angular rotation, a minimum variation unit of the amplitude expansion, or a minimum variation unit of the phase transformation is determined through at least one of: the high-layer signaling or the physical layer signaling; or a second agreement. The frequency domain feedback granularity includes at least one of a subband feedback or a bandwidth feedback.

In an embodiment, the second agreement may include at least one of: a wideband feedback for the angular rotation; a wideband feedback for the amplitude expansion; or a subband feedback for the phase transformation.

In an embodiment, a feedback period of at least one of the angular rotation, the amplitude expansion or the phase transformation is determined through at least one of: the high-layer signaling or the physical layer signaling; or a third agreement.

In an embodiment, the third agreement may include that the feedback period of at least one of the angular rotation, the amplitude expansion or the phase transformation is consistent with a feedback period of the $b_n$ pieces of precoding indication information in the n-th CSI subset.

In an embodiment, the device determines and reports at least one of: the minimum variation unit of at least one of the angular rotation, the amplitude expansion or the phase transformation; the frequency domain feedback granularity of at least one of the angular rotation, the amplitude expansion or the phase transformation; or the feedback period of at least one of the angular rotation, the amplitude expansion or the phase transformation.

In an embodiment, the CSI includes at least one of the precoding indication information or the beam indication information, and at least one of information indicated by the precoding indication information or information indicated by the beam indication information of at least one of a k-th pilot resource group or a k-th pilot port group at an h-th layer is determined by performing at least one of the angular rotation, the amplitude expansion or the phase transformation on the group of base vectors.

In an embodiment, the group of base vectors may include one of: a vector in an identity matrix; or a plurality of column vectors in the identity matrix.

In an embodiment, the CSI includes the precoding indication information or the beam indication information, and the information indicated by the precoding indication information or the information indicated by the beam indication information of at least one of the k-th pilot resource group or the k-th pilot port group at the h-th layer has at least one of characteristics described below. The information indicated by the precoding indication information or the information indicated by the beam indication information of each layer or each pilot resource group or each pilot port group is independently determined by the base vectors. The information indicated by the precoding indication information or the information indicated by the beam indication information of different pilot resource groups or different pilot port groups at a same layer is determined by a same base vector. The information indicated by the precoding indication information or the information indicated by the beam indication information of a same pilot resource group or a same pilot port group at different layers is independently determined by the base vectors. The information indicated by the precoding indication information or the information indicated by the beam indication information of the same pilot resource group or the same pilot port group at the different layers is determined by the same base vector. The information indicated by the precoding indication information or the information indicated by the beam indication information of the different pilot resource groups or the different pilot port groups at the same layer is independently determined by the base vectors. The CSI at the same layer selects the precoding indication information or the beam indication information corresponding to a feedback of a partial resource or port. The CSI at the different layers selects different resources or ports, and the precoding indication information or the beam indication information of the CSI at the different layers is independently determined by the group of base vectors.

In an embodiment, in the CSI at the h-th layer, at least one of information indicated by weighting coefficient amplitude indication information or information indicated by weighting coefficient phase indication information is determined by performing at least one of the angular rotation or the phase transformation on the group of base vectors, where h is an integer greater than or equal to 1.

In an embodiment, the group of base vectors may be determined through at least one of: a high-layer signaling; a physical layer signaling; or a fourth agreement.

In an embodiment, the fourth agreement may include one of: selecting q columns of the identity matrix at a Q-th layer of the CSI to perform at least one of the angular rotation or the phase transformation, where the q columns include at least one of first $q_1$ columns or last $q_1$ columns; or performing at least one of the angular rotation or the phase transformation on different port groups at an X-th layer of the CSI according to x columns of the identity matrix, where the x columns include at least one of first $x_1$ columns or last $x_1$ columns.

In an embodiment, at least one of the angular rotation or the phase transformation includes acting a transformation matrix on one or more vectors in the group of base vectors. The transformation matrix includes at least one of t phase transformation matrices or a product of r angular rotation matrices, where t and r are both greater than or equal to 1.

In an embodiment, each of the phase transformation matrices is a diagonal matrix, where a diagonal element of the diagonal matrix includes at least one of: a positive real number; or a natural exponential function of a complex number. In an embodiment, the diagonal element of the diagonal matrix may be 1 or the natural exponential function of the complex number.

In an embodiment, the device may include at least one of the following: the CSI at each layer corresponds to at least one of the phase transformation matrices, where the phase transformation matrix corresponding to the CSI at the h-th layer includes at least f(h) diagonal elements of 1, where f(h) is a positive integer function of 1, and f(h) is less than or equal to 1; or the CSI at the each layer corresponds to at least one of the angular rotation matrices, where the angular rotation matrix corresponding to the CSI at the h-th layer is determined by transforming at least one of elements in a g(h)-th row and an n-th column, elements in an n-th row and a g(h)-th column, elements in the g(h)-th row and the g(h)-th column, or elements in the n-th row and the n-th column in the identity matrix, where g(h) and n are both greater than or equal to 1, n is not equal to g(h), g(h) is a positive integer function of h, and a trigonometric function of a real number is obtained after the elements are transformed.

In an embodiment, a number of angular rotation matrices corresponding to the CSI at the each layer decreases with an increase of a number of layers of the angular rotation matrix.

In an embodiment, at least one of a frequency domain feedback granularity of information in the phase transformation matrix, a frequency domain feedback granularity of information in the angular rotation matrix, a feedback period of the information in the phase transformation matrix, a feedback period of the information in the angular rotation matrix, a minimum variation unit of the information in the phase transformation matrix or a minimum variation unit of the information in the angular rotation matrix is determined through at least one of: a high-layer signaling; a physical layer signaling; or a fifth agreement.

In an embodiment, the fifth agreement includes at least one of: a wideband feedback of the information in the angular rotation matrix; a subband feedback of the information in the phase transformation matrix; the feedback period of the information in the angular rotation matrix being C times the feedback period of the information in the phase transformation matrix, where C is a positive integer; or the information in the angular rotation matrix having at least one of a same feedback period or a same frequency domain feedback granularity as precoding indication information in a corresponding CSI subset.

In an embodiment, the device further determines and reports at least one of: the frequency domain feedback granularity of the information in the phase transformation matrix; the frequency domain feedback granularity of the information in the angular rotation matrix; the feedback period of the information in the phase transformation matrix; the feedback period of the information in the angular rotation matrix; the minimum variation unit of the information in the phase transformation matrix; or the minimum variation unit of the information in the angular rotation matrix.

In an embodiment, the CSI at the same layer has at least two port groups with at least one of same phase transformation information or same angular rotation information.

In an embodiment, for the CSI of different port groups, at least one of the phase transformation information or the angular rotation information may be fed back in at least one of the following manners: at least one of the phase transformation information or the angular rotation information is separately fed back for the different port groups; or at least one of the phase transformation information or the angular rotation information is jointly fed back for the different port groups.

Figure 6:
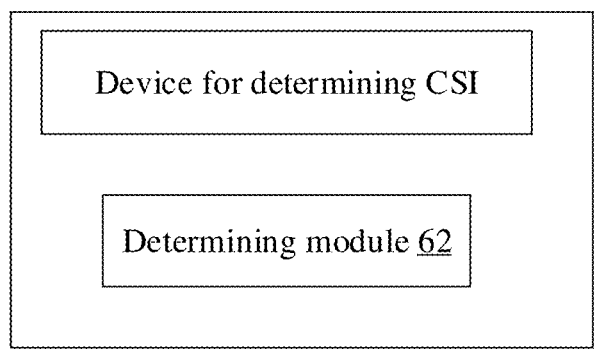
FIG. 6 is a block diagram of a device for determining CSI according to an embodiment.

FIG. 6 is a block diagram of a device for determining CSI according to an embodiment. As shown in FIG. 6, the device includes a determining module 62.

The determining module 62 is configured to determine CSI fed back by a terminal according to a structure of the CSI. A specific structure of the CSI includes M CSI subsets, where an m-th CSI subset among the M CSI subsets includes $k_m$ channel information components, the M CSI subsets include N CSI subsets, and an n-th CSI subset among the N CSI subsets includes $L_n$ channel information components which are determined by transforming a group of vectors, where M is a positive integer, N is a positive integer less than or equal to M, m and n are both positive integers, $k_m$ is an integer greater than or equal to 0, and $L_n$ is an integer greater than or equal to 0 and less than or equal to $k_m$.

In an embodiment, the $k_m$ channel information components may include at least one of: $B_m$ pieces of precoding indication information, where $B_m$ is an integer greater than or equal to 0; $A_m$ pieces of weighting coefficient amplitude indication information, where $A_m$ is an integer greater than or equal to 0; $P_m$ pieces of weighting coefficient phase indication information, where $P_m$ is an integer greater than or equal to 0; or $R_m$ pieces of beam indication information, where $R_m$ is an integer greater than or equal to 0.

In an embodiment, in the CSI subset, information indicated by the $A_m$ pieces of weighting coefficient amplitude indication information and information indicated by the $P_m$ pieces of weighting coefficient phase indication information constitute a weighting coefficient vector, and weighting coefficient vectors of at least one group of CSI subsets are orthogonal to each other, where $A_m$ and $P_m$ are both integers greater than or equal to 0.

In an embodiment, the CSI subsets may be determined according to at least one of: groups of measurement pilot resources; groups of measurement pilot ports; groups of demodulation pilot resources; groups of demodulation pilot ports; or layers.

In an embodiment, a manner for determining the CSI subsets may be determined by at least one of: notifying the terminal to determine the manner via a high-layer signaling; or notifying the terminal to determine the manner via a physical layer signaling.

In an embodiment, information indicated by $b_m$ pieces of precoding indication information included in the $B_m$ pieces of precoding indication information is determined by at least one of: performing an angular rotation on information indicated by $b_n$ pieces of precoding indication information in the n-th CSI subset; performing an amplitude expansion on the information indicated by the $b_n$ pieces of precoding indication information in the n-th CSI subset; or performing a phase transformation on the information indicated by the $b_n$ pieces of precoding indication information in the n-th CSI subset; where $b_m$ and $b_n$ are both positive integers, and $b_m$ is less than or equal to $B_m$.

In an embodiment, the angular rotation is performed by acting an angular rotation matrix on the information indicated by the precoding indication information. The angular rotation matrix includes at least one of: an identity matrix; a first diagonal matrix whose diagonal elements constitute a DFT vector; or a second diagonal matrix whose diagonal elements constitute a Kronecker product of S DFT vectors, where an s-th DFT vector among the S DFT vectors corresponds to an s-th piece of angular rotation information, where S is a positive integer greater than 1, and s is a positive integer greater than or equal to 1 and less than or equal to S.

In an embodiment, information indicated by precoding indication information in at least two CSI subsets included in the CSI subsets has same information on at least one of: the angular rotation, the amplitude expansion or the phase transformation.

In an embodiment, a value of $b_m$ may be determined by at least one of: notifying the terminal to determine the value of $b_m$ via a high-layer signaling; notifying the terminal to determine the value of $b_m$ via a physical layer signaling; or a first agreement.

In an embodiment, the first agreement may include that $b_m$ is equal to $B_m$.

In an embodiment, at least one of a frequency domain feedback granularity of the angular rotation, a frequency domain feedback granularity of the amplitude expansion, a frequency domain feedback granularity of the phase transformation, a minimum variation unit of the angular rotation, a minimum variation unit of the amplitude expansion, or a minimum variation unit of the phase transformation is determined by at least one of: notifying the terminal to perform determination via a high-layer signaling or a physical layer signaling; or a second agreement. The frequency domain feedback granularity includes at least one of a subband feedback or a bandwidth feedback.

In an embodiment, the second agreement may include at least one of: a wideband feedback for the angular rotation; a wideband feedback for the amplitude expansion; or a subband feedback for the phase transformation.

In an embodiment, a feedback period of at least one of the angular rotation, the amplitude expansion or the phase transformation is determined by at least one of: notifying the terminal to determine the feedback period via a high-layer signaling or a physical layer signaling; or a third agreement.

In an embodiment, the third agreement may include that the feedback period of at least one of the angular rotation, the amplitude expansion or the phase transformation is consistent with a feedback period of the $b_n$ pieces of precoding indication information in the n-th CSI subset.

In an embodiment, the device receives at least one of: the minimum variation unit of at least one of the angular rotation, the amplitude expansion or the phase transformation; the frequency domain feedback granularity of at least one of the angular rotation, the amplitude expansion or the phase transformation; or the feedback period of at least one of the angular rotation, the amplitude expansion or the phase transformation.

In an embodiment, the CSI includes at least one of the precoding indication information or the beam indication information, and at least one of information indicated by the precoding indication information or information indicated by the beam indication information of at least one of a k-th pilot resource group or a k-th pilot port group at an h-th layer is determined by performing at least one of the angular rotation, the amplitude expansion or the phase transformation on a group of base vectors.

In an embodiment, the group of base vectors includes one of: a vector in an identity matrix; or a plurality of column vectors in the identity matrix.

In an embodiment, the information indicated by the precoding indication information or the information indicated by the beam indication information of at least one of the k-th pilot resource group or the k-th pilot port group at the h-th layer of the CSI has at least one of characteristics described below. The information indicated by the precoding indication information or the information indicated by the beam indication information of each layer or each pilot resource group or each pilot port group is independently determined by the base vectors. The information indicated by the precoding indication information or the information indicated by the beam indication information of different pilot resource groups or different pilot port groups at a same layer is determined by a same base vector. The information indicated by the precoding indication information or the information indicated by the beam indication information of a same pilot resource group or a same pilot port group at different layers is independently determined by the base vectors. The information indicated by the precoding indication information or the information indicated by the beam indication information of the same pilot resource group or the same pilot port group at the different layers is determined by the same base vector. The information indicated by the precoding indication information or the information indicated by the beam indication information of the different pilot resource groups or the different pilot port groups at the same layer is independently determined by the base vectors. The CSI at the same layer selects the precoding indication information or the beam indication information corresponding to a feedback of a partial resource or port. The CSI at the different layers selects different resources or ports, and the precoding indication information or the beam indication information of the CSI at the different layers is independently determined by the group of base vectors.

In an embodiment, in the CSI at the h-th layer, at least one of information indicated by weighting coefficient amplitude indication information or information indicated by weighting coefficient phase indication information is determined by performing at least one of the angular rotation or the phase transformation on the group of base vectors, where h is an integer greater than or equal to 1.

In an embodiment, the group of base vectors is determined by at least one of: notifying the terminal to determine the group of base vectors via a high-layer signaling; notifying the terminal to determine the group of base vectors via a physical layer signaling; or a fourth agreement.

In an embodiment, the fourth agreement may include one of: selecting q columns of the identity matrix at a Q-th layer of the CSI to perform at least one of the angular rotation or the phase transformation, where the q columns include at least one of first $q_1$ columns or last $q_1$ columns; or performing at least one of the angular rotation or the phase transformation on different port groups at an X-th layer of the CSI according to x columns of the identity matrix, where the x columns include at least one of first $x_1$ columns or last $x_1$ columns.

In an embodiment, at least one of the angular rotation or the phase transformation includes acting a transformation matrix on one or more vectors in the group of base vectors. The transformation matrix includes at least one of t phase transformation matrices or a product of r angular rotation matrices, where t and r are both greater than or equal to 1.

In an embodiment, each of the phase transformation matrices may be a diagonal matrix, where a diagonal element of the diagonal matrix includes at least one of: 1 or a natural exponential function of a complex number.

In an embodiment, the device may include at least one of the following: the CSI at each layer corresponds to at least one of the phase transformation matrices, where the phase transformation matrix corresponding to the CSI at the h-th layer includes at least f(h) diagonal elements of 1, where f(h) is a positive integer function of 1, and f(h) is less than or equal to 1; or the CSI at the each layer corresponds to at least one of the angular rotation matrices, where the angular rotation matrix corresponding to the CSI at the h-th layer is determined by transforming at least one of elements in a g(h)-th row and an n-th column, elements in an n-th row and a g(h)-th column, elements in the g(h)-th row and the g(h)-th column, or elements in the n-th row and the n-th column in the identity matrix, where g(h) and n are both greater than or equal to 1, n is not equal to g(h), g(h) is a positive integer function of 1, and a trigonometric function of a real number is obtained after the elements are transformed.

In an embodiment, a number of angular rotation matrices corresponding to the CSI at the each layer decreases with an increase of a number of layers of the angular rotation matrix.

In an embodiment, at least one of a frequency domain feedback granularity of information in the phase transformation matrix, a frequency domain feedback granularity of information in the angular rotation matrix, a feedback period of the information in the phase transformation matrix, a feedback period of the angular rotation matrix, a minimum variation unit of the phase transformation matrix or a minimum variation unit of the information in the angular rotation matrix is determined by at least one of: notifying the terminal to perform determination via a high-layer signaling; notifying the terminal to perform determination via a physical layer signaling; or a fifth agreement.

In an embodiment, the fifth agreement includes at least one of: a wideband feedback of the information in the angular rotation matrix; a subband feedback of the information in the phase transformation matrix; a feedback period of the information in the angular rotation matrix being C times the feedback period of the information in the phase transformation matrix, where C is a positive integer; or the information in the angular rotation matrix having at least one of a same feedback period or a same frequency domain feedback granularity as precoding indication information in a corresponding CSI subset.

In an embodiment, the device may further receive at least one of: the frequency domain feedback granularity of the information in the phase transformation matrix; the frequency domain feedback granularity of the information in the angular rotation matrix; the feedback period of the information in the phase transformation matrix; the feedback period of the information in the angular rotation matrix; a minimum variation unit of the information in the phase transformation matrix; or the minimum variation unit of the information in the angular rotation matrix.

In an embodiment, the CSI at the same layer has at least two port groups with at least one of same phase transformation information or same angular rotation information.

In an embodiment, for the CSI of different port groups, at least one of the phase transformation information or the angular rotation information fed back by the terminal is received in at least one of the following manners: at least one of the phase transformation information or the angular rotation information is separately fed back for the different port groups; or at least one of the phase transformation information or the angular rotation information is jointly fed back for the different port groups.

An embodiment provides a device for feeding back CSI. The device includes a first processor and a first memory configured to store instructions executable by the first processor. The first processor is configured to feed back CSI according to a determined structure of the CSI. The structure of the CSI includes M CSI subsets, where an m-th CSI subset among the M CSI subsets includes $k_m$ channel information components, the M CSI subsets include N CSI subsets, and an n-th CSI subset among the N CSI subsets includes $L_n$ channel information components which are determined by transforming a group of base vectors, where M is a positive integer, N is a positive integer less than or equal to M, m and n are both positive integers, $k_m$ is an integer greater than or equal to 0, and $L_n$ is an integer greater than or equal to 0 and less than or equal to $k_m$.

In an embodiment, the $k_m$ channel information components may include at least one of: $B_m$ pieces of precoding indication information, where $B_m$ is an integer greater than or equal to 0; $A_m$ pieces of weighting coefficient amplitude indication information, where $A_m$ is an integer greater than or equal to 0; $P_m$ pieces of weighting coefficient phase indication information, where $P_m$ is an integer greater than or equal to 0; or $R_m$ pieces of beam indication information, where $R_m$ is an integer greater than or equal to 0.

In an embodiment, in the CSI subset, information indicated by the $A_m$ pieces of weighting coefficient amplitude indication information and information indicated by the $P_m$ pieces of weighting coefficient phase indication information constitute a weighting coefficient vector, and weighting coefficient vectors of at least one group of CSI subsets are orthogonal to each other, where $A_m$ and $P_m$ are both integers greater than or equal to 0.

In an embodiment, the CSI subsets may be determined according to at least one of: groups of measurement pilot resources; groups of measurement pilot ports; groups of demodulation pilot resources; groups of demodulation pilot ports; or layers.

In an embodiment, a manner for determining the CSI subsets is determined through at least one of: a high-layer signaling or a physical layer signaling.

In an embodiment, information indicated by $b_m$ pieces of precoding indication information included in the $B_m$ pieces of precoding indication information may be determined by at least one of: performing an angular rotation on information indicated by $b_n$ pieces of precoding indication information in the n-th CSI subset; performing an amplitude expansion on the information indicated by the $b_n$ pieces of precoding indication information in the n-th CSI subset; or performing a phase transformation on the information indicated by the $b_n$ pieces of precoding indication information in the n-th CSI subset; where $b_m$ and $b_n$ are both positive integers, and $b_m$ is less than or equal to $B_m$.

An embodiment provides a device for determining CSI. The device includes a second processor and a second memory configured to store instructions executable by the second processor. The second processor is configured to determine CSI fed back by a terminal according to a structure of the CSI. A specific structure of the CSI includes M CSI subsets, where an m-th CSI subset among the M CSI subsets includes $k_m$ channel information components, the M CSI subsets include N CSI subsets, and an n-th CSI subset among the N CSI subsets includes $L_n$ channel information components which are determined by transforming a group of vectors, where M is a positive integer, N is a positive integer less than or equal to M, m and n are both positive integers, $k_m$ is an integer greater than or equal to 0, and $L_n$ is an integer greater than or equal to 0 and less than or equal to $k_m$.

In an embodiment, the $k_m$ channel information components may include at least one of: $B_m$ pieces of precoding indication information, where $B_m$ is an integer greater than or equal to 0; $A_m$ pieces of weighting coefficient amplitude indication information, where $A_m$ is an integer greater than or equal to 0; $P_m$ pieces of weighting coefficient phase indication information, where $P_m$ is an integer greater than or equal to 0; or $R_m$ pieces of beam indication information, where $R_m$ is an integer greater than or equal to 0.

In an embodiment, in the CSI subset, information indicated by the $A_m$ pieces of weighting coefficient amplitude indication information and information indicated by the $P_m$ pieces of weighting coefficient phase indication information constitute a weighting coefficient vector, and weighting coefficient vectors of at least one group of CSI subsets are orthogonal to each other, where $A_m$ and $P_m$ are both integers greater than or equal to 0.

In an embodiment, the CSI subsets may be determined according to at least one of: groups of measurement pilot resources; groups of measurement pilot ports; groups of demodulation pilot resources; groups of demodulation pilot ports; or layers.

In an embodiment, a manner for determining the CSI subsets may be determined by at least one of: notifying the terminal to determine the manner via a high-layer signaling; or notifying the terminal to determine the manner via a physical layer signaling.

In an embodiment, information indicated by $b_m$ pieces of precoding indication information included in the $B_m$ pieces of precoding indication information may be determined by at least one of: performing an angular rotation on information indicated by $b_n$ pieces of precoding indication information in the n-th CSI subset; performing an amplitude expansion on the information indicated by the $b_n$ pieces of precoding indication information in the n-th CSI subset; or performing a phase transformation on the information indicated by the $b_n$ pieces of precoding indication information in the n-th CSI subset; where $b_m$ and $b_n$ are both positive integers, and $b_m$ is less than or equal to $B_m$.

The various modules described above may be implemented by software or hardware. In the implementation by hardware, the various modules are located in the same processor or located in their respective processors in any combination form.

An embodiment provides a storage medium. In an embodiment, the storage medium may be configured to store program codes for executing the multiple steps described above.

In an embodiment, the storage medium may include a USB flash disk, a ROM, a RAM, a mobile hard disk, a magnetic disk, an optical disk or another medium capable of storing program codes.

In an embodiment, a processor executes the steps described above according to the program codes stored in the storage medium.

The various modules or steps described above may be implemented by a general-purpose computing device. The various modules or steps may be concentrated on a single computing device or distributed on a network composed of multiple computing devices. Optionally, the various modules or steps may be implemented by program codes executable by the computing devices, so that they may be stored in a storage device and executed by the computing devices.

In some circumstances, the illustrated or described steps may be executed in sequences different from those described herein, or the various modules or steps may be made into various integrated circuit modules, or multiple modules or steps therein may be made into a single integrated circuit module for implementation.

INDUSTRIAL APPLICABILITY

The method and the device for feeding back CSI and the method and the device for determining CSI may solve the problem in the related technology that a correlation between multiple panels of antennas cannot be well fed back and inter-layer orthogonality cannot be guaranteed through a multi-layer linear combination codebook.

What is claimed is:

1. A method for feeding back channel state information (CSI), comprising:
    feeding back CSI according to a determined structure of the CSI;
    wherein the structure of the CSI comprises M CSI subsets;
    wherein an m-th CSI subset among the M CSI subsets comprises $k_m$ channel information components; and
    wherein the channel information components of an m-th CSI subset among the M CSI subsets are determined by performing at least one of an amplitude expansion or a phase transformation on a group of base vectors which comprises a plurality of column vectors in an identity matrix;
    wherein M and m are positive integers, $k_m$ is an integer greater than or equal to 0; and
    wherein each of the CSI subsets is associated with at least one of:
        a measurement pilot port group; or
        a layer; and
    wherein the CSI comprises precoding indication information, and information indicated by the precoding indication information of a k-th pilot port group at an h-th layer is determined by performing at least one of an amplitude expansion or a phase transformation on a group of base vectors which comprises a plurality of column vectors in an identity matrix, wherein k and h are integers; and
    wherein the identity matrix is an n×n square matrix with ones on the main diagonal and zeros elsewhere, n is an integer greater than or equal to 1.

2. The method of claim 1, wherein the $k_m$ channel information components comprise at least one of:
    $B_m$ pieces of precoding indication information, wherein $B_m$ is an integer greater than or equal to 0;
    $A_m$ pieces of weighting coefficient amplitude indication information, wherein $A_m$ is an integer greater than or equal to 0; or $P_m$ pieces of weighting coefficient phase indication information, wherein $P_m$ is an integer greater than or equal to 0.

3. A method for determining channel state information (CSI), comprising:
   determining CSI fed back by a terminal according to a structure of the CSI;
   wherein a structure of the CSI comprises M CSI subsets;
   wherein an m-th CSI subset among the M CSI subsets comprises $k_m$ channel information components; and
   wherein the channel information components of an m-th CSI subset among the M CSI subsets are determined by performing at least one of an amplitude expansion or a phase transformation on a group of base vectors which comprises a plurality of column vectors in an identity matrix;
   wherein M and m are positive integers, $k_m$ is an integer greater than or equal to 0; and
   wherein each of the CSI subsets is associated with at least one of:
      a measurement pilot port group; or
      a layer; and
   wherein the CSI comprises precoding indication information, and information indicated by the precoding indication information of a k-th pilot port group at an h-th layer is determined by performing at least one of an amplitude expansion or a phase transformation on a group of base vectors which comprises a plurality of column vectors in an identity matrix, wherein k and h are integers; and
   wherein the identity matrix is an n×n square matrix with ones on the main diagonal and zeros elsewhere, n is an integer greater than or equal to 1.

4. The method of claim 3, wherein the $k_m$ channel information components comprise at least one of:
   $B_m$ pieces of precoding indication information, wherein $B_m$ is an integer greater than or equal to 0;
   $A_m$ pieces of weighting coefficient amplitude indication information, wherein $A_m$ is an integer greater than or equal to 0; or
   $P_m$ pieces of weighting coefficient phase indication information, wherein $P_m$ is an integer greater than or equal to 0.

5. A device for feeding back channel state information (CSI), comprising:
   a first processor; and
   a first memory, configured to store instructions executable by the first processor;
   wherein the first processor is configured to:
   feed back CSI according to a determined structure of the CSI;
   wherein the structure of the CSI comprises M CSI subsets;
   wherein an m-th CSI subset among the M CSI subsets comprises $k_m$ channel information components; and
   wherein the channel information components of an m-th CSI subset among the M CSI subsets are determined by performing at least one of an amplitude expansion or a phase transformation on a group of base vectors which comprises a plurality of column vectors in an identity matrix;
   wherein M and m are positive integers, $k_m$ is an integer greater than or equal to 0; and
   wherein each of the CSI subsets is associated with at least one of:
      a measurement pilot port group; or
      a layer; and
   wherein the CSI comprises precoding indication information, and information indicated by the precoding indication information of a k-th pilot port group at an h-th layer is determined by performing at least one of an amplitude expansion or a phase transformation on a group of base vectors which comprises a plurality of column vectors in an identity matrix, wherein k and h are integers; and
   wherein the identity matrix is an n×n square matrix with ones on the main diagonal and zeros elsewhere, n is an integer greater than or equal to 1.

6. The device of claim 5, wherein the $k_m$ channel information components comprise at least one of:
   $B_m$ pieces of precoding indication information, wherein $B_m$ is an integer greater than or equal to 0;
   $A_m$ pieces of weighting coefficient amplitude indication information, wherein $A_m$ is an integer greater than or equal to 0; or
   $P_m$ pieces of weighting coefficient phase indication information, wherein $P_m$ is an integer greater than or equal to 0.

7. A device for determining channel state information (CSI), comprising:
   a second processor; and
   a second memory, configured to store instructions executable by the second processor;
   wherein the second processor is configured to:
   determine CSI fed back by a terminal according to a structure of the CSI;
   wherein a structure of the CSI comprises M CSI subsets;
   wherein an m-th CSI subset among the M CSI subsets comprises $k_m$ channel information components; and
   wherein the channel information components of an m-th CSI subset among the M CSI subsets are determined by performing at least one of an amplitude expansion or a phase transformation on a group of base vectors which comprises a plurality of column vectors in an identity matrix;
   wherein M and m are positive integers, $k_m$ is an integer greater than or equal to 0; and
   wherein each of the CSI subsets is associated with at least one of:
      a measurement pilot port group; or
      a layer; and
   wherein the CSI comprises precoding indication information, and information indicated by the precoding indication information of a k-th pilot port group at an h-th layer is determined by performing at least one of an amplitude expansion or a phase transformation on a group of base vectors which comprises a plurality of column vectors in an identity matrix, wherein k and h are integers; and
   wherein the identity matrix is an n×n square matrix with ones on the main diagonal and zeros elsewhere, n is an integer greater than or equal to 1.

8. The device of claim 7, wherein the $k_m$ channel information components comprise at least one of:
   $B_m$ pieces of precoding indication information, wherein $B_m$ is an integer greater than or equal to 0;
   $A_m$ pieces of weighting coefficient amplitude indication information, wherein $A_m$ is an integer greater than or equal to 0; or
   $P_m$ pieces of weighting coefficient phase indication information, wherein $P_m$ is an integer greater than or equal to 0.

* * * * *

UNITED STATES PATENT AND TRADEMARK OFFICE
CERTIFICATE OF CORRECTION

PATENT NO. : 11,652,515 B2
APPLICATION NO. : 16/476828
DATED : May 16, 2023
INVENTOR(S) : Hao Wu et al.

It is certified that error appears in the above-identified patent and that said Letters Patent is hereby corrected as shown below:

On the Title Page

Column 2 (Item (57) Abstract), Line 6, delete "km" and insert -- $k_m$ --.

Page 2, Column 1 (Item (57) Abstract), Line 1, delete "Ln" and insert -- $L_n$ --.

In the Specification

Column 14, Line 48, delete "5G" and insert -- 5G, --.

Column 21, Line 24, delete "matrix 5" and insert -- matrix --.

Column 29, Line 35, delete " $\mathbf{f}_{l_1}^{H}\mathbf{f}_{l_2}$ " and insert -- $\mathbf{f}_{l_1}^{H}\mathbf{f}_{l_2} = 0$ --.

Column 29, Line 36-40 (approx.), delete " $\sum_{n=1}^{N}\sum_{i=1}^{2} a_{n,i,l_1}^{*} = 0.$ " and insert -- $\sum_{n=1}^{N}\sum_{i=1}^{2} a_{n,i,l_2}^{*} a_{n,i,l_1} = 0.$ --.

Column 29, Line 66-67 (approx.), delete "exp $(j\phi_{2N,m})$;" and insert -- exp $(j\phi_{2N,m})$); --.

Signed and Sealed this
Tenth Day of October, 2023

*Katherine Kelly Vidal*
*Director of the United States Patent and Trademark Office*

CERTIFICATE OF CORRECTION (continued)
U.S. Pat. No. 11,652,515 B2

Column 31, Line 25-26 (approx.), delete "$\begin{bmatrix} \cos\left(\theta_{n,m}^{(i)}\right) & \sin\left(\theta_{n,m}^{(i)}\right) \\ \sin\left(\theta_{n,m}^{(i)}\right) & -\cos\left(\theta_{n,m}^{(i)}\right) \end{bmatrix}.$" and insert --$\begin{bmatrix} \cos\left(\theta_{n,m}^{(i)}\right) & \sin\left(\theta_{n,m}^{(i)}\right) \\ \sin\left(\theta_{n,m}^{(i)}\right) & -\cos\left(\theta_{n,m}^{(i)}\right) \end{bmatrix}$--.